US012752230B2

(12) United States Patent
Girondi

(10) Patent No.: US 12,752,230 B2
(45) Date of Patent: Oct. 6, 2026

(54) AIR FILTRATION ASSEMBLY

(71) Applicant: UFI INNOVATION CENTER S.R.L., Ala (Trento) (IT)

(72) Inventor: Giorgio Girondi, Ala (Trento) (IT)

(73) Assignee: UFI INNOVATION CENTER S.R.L., Ala (Trento) (IT)

(*) Notice: Subject to any disclaimer, the term of this patent is extended or adjusted under 35 U.S.C. 154(b) by 283 days.

(21) Appl. No.: 18/681,365

(22) PCT Filed: Jul. 27, 2022

(86) PCT No.: PCT/IB2022/056926
§ 371 (c)(1),
(2) Date: Feb. 5, 2024

(87) PCT Pub. No.: WO2023/012597
PCT Pub. Date: Feb. 9, 2023

(65) Prior Publication Data

US 2025/0144554 A1 May 8, 2025

(30) Foreign Application Priority Data

Aug. 6, 2021 (IT) ........................ 102021000021452

(51) Int. Cl.
*B01D 46/24* (2006.01)
*B01D 46/00* (2022.01)
(Continued)

(52) U.S. Cl.
CPC ..... *B01D 46/2414* (2013.01); *B01D 46/0004* (2013.01); *B01D 46/0005* (2013.01);
(Continued)

(58) Field of Classification Search
CPC ............ B01D 46/2414; B01D 46/0004; B01D 46/0005; B01D 46/2407; B01D 46/58;
(Continued)

(56) References Cited

U.S. PATENT DOCUMENTS 4,322,231 A 3/1982 Hilzendeger et al.
4,645,520 A * 2/1987 Huttlin .................. B01D 46/71
55/508

(Continued)

OTHER PUBLICATIONS

International Search Report, issued in PCT/IB2022/056926, mailed Aug. 31, 2022, Rijswijk, NL.
Italian Search Report, Munich, Feb. 21, 2022.

*Primary Examiner* — Charles G Freay
(74) *Attorney, Agent, or Firm* — Valauskas Corder LLC

(57) ABSTRACT

An air filtration assembly has a box having a wall having at least one outflow mouth, and a filtering cartridge insertable into the box and having at least two tubular filtering partitions and a plate group having a plate body extending with respect to an imaginary development plane and having a first face having at least one sealing profile, a second face having at least two abutment profiles, and at least one outflow opening for putting the tubular filtering partitions in fluid communication with the at least one outflow mouth. The box has a housing region. The plate group is housed in the housing region. The at least one sealing profile and/or the at least two abutment profiles are shaped or mutually positioned with respect to the imaginary development plane having vertical and longitudinal variable distances therefrom. The plate body is a single component made of an elastically yielding material, and is subjected to volume compression.

23 Claims, 15 Drawing Sheets

(51) Int. Cl.
*B01D 46/58* (2022.01)
*F02M 35/02* (2006.01)
*F02M 35/024* (2006.01)

(52) U.S. Cl.
CPC ......... *B01D 46/2407* (2013.01); *B01D 46/58* (2022.01); *F02M 35/0215* (2013.01); *F02M 35/02416* (2013.01); *B01D 2265/026* (2013.01); *B01D 2271/02* (2013.01); *B01D 2279/60* (2013.01)

(58) Field of Classification Search
CPC ........ B01D 2265/026; B01D 2271/026; F02M 35/0215; F02M 35/02416
See application file for complete search history.

(56) References Cited

U.S. PATENT DOCUMENTS

| | | | | |
|---|---|---|---|---|
| 4,704,953 | A | 11/1987 | Wilson | |
| 4,871,380 | A | 10/1989 | Meyers | |
| 9,216,373 | B2 | 12/2015 | Girondi | |
| 2006/0254229 | A1 * | 11/2006 | Schrage | B01D 46/0004 55/498 |
| 2008/0086995 | A1 | 4/2008 | Westlund | |
| 2012/0110962 | A1 * | 5/2012 | Dewit | B01D 46/0005 55/357 |
| 2015/0265960 | A1 * | 9/2015 | Girondi | F02M 35/02483 55/399 |
| 2016/0059689 | A1 * | 3/2016 | Girondi | F02M 35/161 180/68.1 |

* cited by examiner

AIR FILTRATION ASSEMBLY

CROSS-REFERENCE TO RELATED APPLICATIONS

This application is a U.S. National Phase filing of PCT International Patent Application No. PCT/IB2022/056926, having an international filing date of Jul. 27, 2022, which claims priority to Italian Patent Application No. 102021000021452, filed Aug. 6, 2021 each of which is hereby incorporated by reference in its entirety.

FIELD OF APPLICATION

The present invention relates to an air filtration assembly of a vehicle. Furthermore, the present invention also relates to an engine air supply system of a vehicle comprising the air filtration assembly of a vehicle.

The context to which the present invention pertains is that of air filtration assemblies in the automotive field. Specifically, it relates to the air filtration assemblies suitable for filtering the air sucked in from the environment to be brought into the combustion chamber of the endothermic engine.

In particular, such assemblies aim at filtering the air so as to eliminate suspended particles therefrom, which, arriving in the combustion chamber, could damage the engine (or the components thereof) or cause ineffective combustion.

It is therefore essential that the air filtration is carried out effectively and efficiently, avoiding the possibility of a drawing and therefore avoiding the possibility of dirt reaching the combustion chamber.

BACKGROUND OF THE INVENTION

The known air filtration assemblies comprise specific boxes and specific filtering cartridges, typically panel elements, housed in said boxes.

The main problem of the known air filtration assemblies lies precisely in an incorrect operation of the filtering cartridge thereof, typically due to improper positioning into the box.

Specifically, in fact, in the known solutions of the prior art, the problem linked to the incorrect positioning of the filtering cartridge is typical, which engages the box with an ineffective seal, thus having a partial drawing of air, with consequent inefficient filtration. Furthermore, incorrectly performing the operations to insert the filtering cartridge into the box results in potential damage to the filtering cartridge and/or the sealing profiles thereof, again causing ineffective air filtration.

In order to overcome this problem, multiple embodiments of air filtration assemblies have been implemented in the prior art in which the filtering cartridges and/or special components for housing the filtering cartridges, such as drawers, and/or the housing boxes of the filtering cartridges are subject to specific movements aimed at performing a correct positioning between the parts.

However, it has been verified that such solutions do not fully resolve the above technical problem. In fact, such known solutions lack simple maintenance operations, and thus lack having simple methods for inserting new filtering cartridges into respective boxes, thus having a high probability of error, resulting in the possibility that a filtering cartridge is incorrectly housed inside the box thereof.

SUMMARY OF THE INVENTION

The need is therefore strongly felt to provide an air filtration assembly having a box and a filtering cartridge housable in said box, in which the filtering cartridge has efficient filtering properties, and is simultaneously insertable into the box in a simple and intuitive manner, but above all ensuring an effective seal and thus obviating the possibility of drawing.

Precisely, it is the object of the present invention to provide an air filtration assembly in which the aforementioned need is solved, and thus the needs of the specific application field are also met in an effective and efficient manner.

Such an object is achieved by the air filtration assembly and an engine air supply system of a vehicle comprising the filtration assembly, as described and claimed herein.

Preferred variants implying further advantageous aspects are also described.

DESCRIPTION OF THE DRAWINGS

Further features and advantages of the invention will become apparent from the description provided below of preferred exemplary embodiments thereof, given by way of non-limiting example, with reference to the accompanying drawings, in which.

DETAILED DESCRIPTION

Figure 1A:
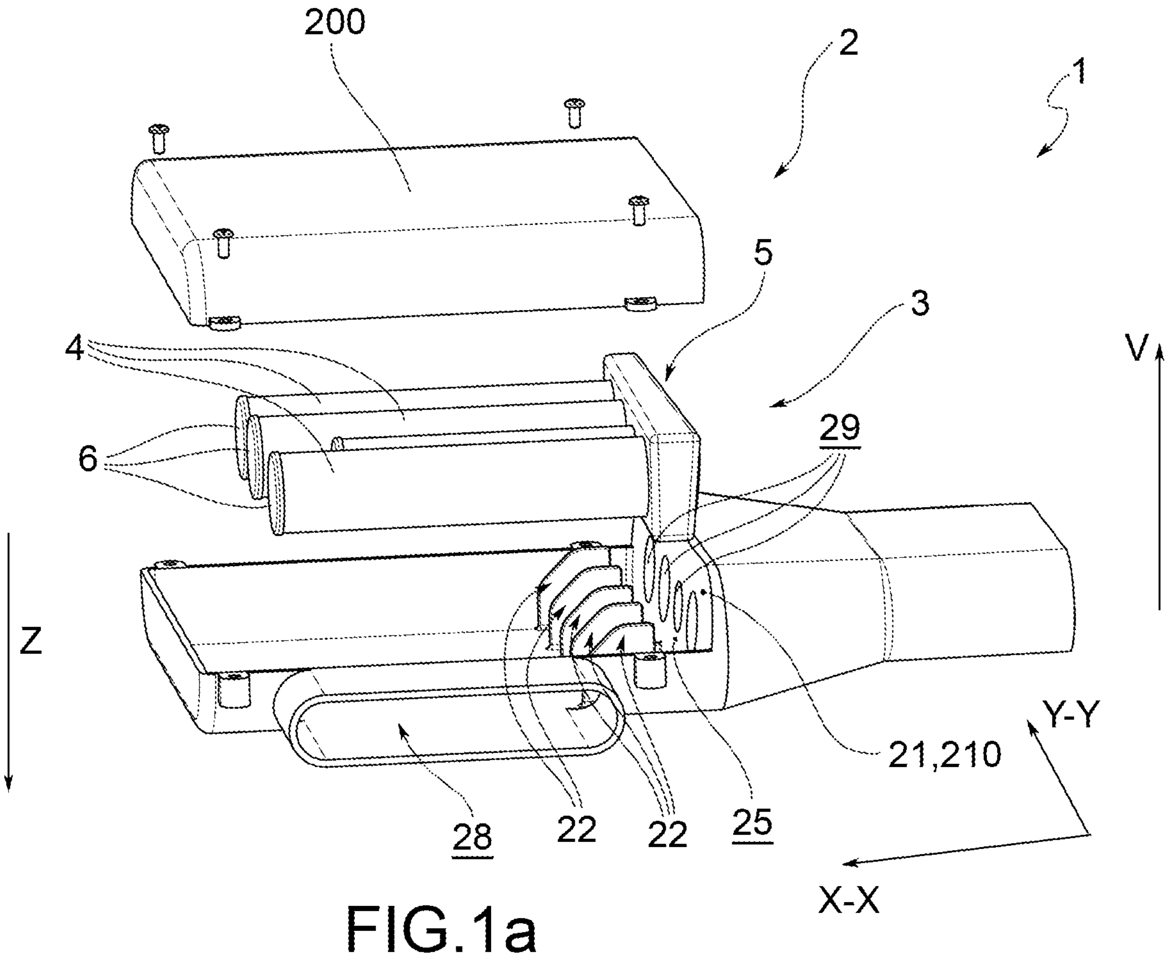
FIGS. 1*a* and 1*b* show two perspective views with separate parts of an air filtration assembly, in accordance with a first preferred embodiment.
Figure 1B:
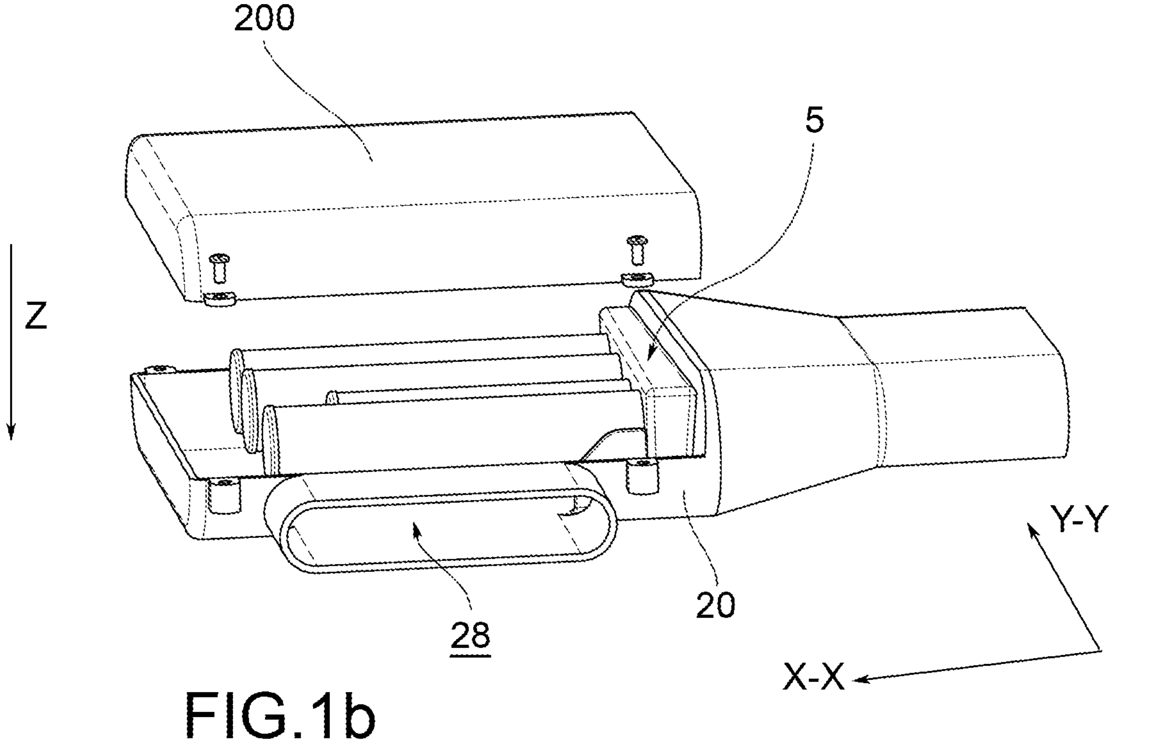
Figure 2:
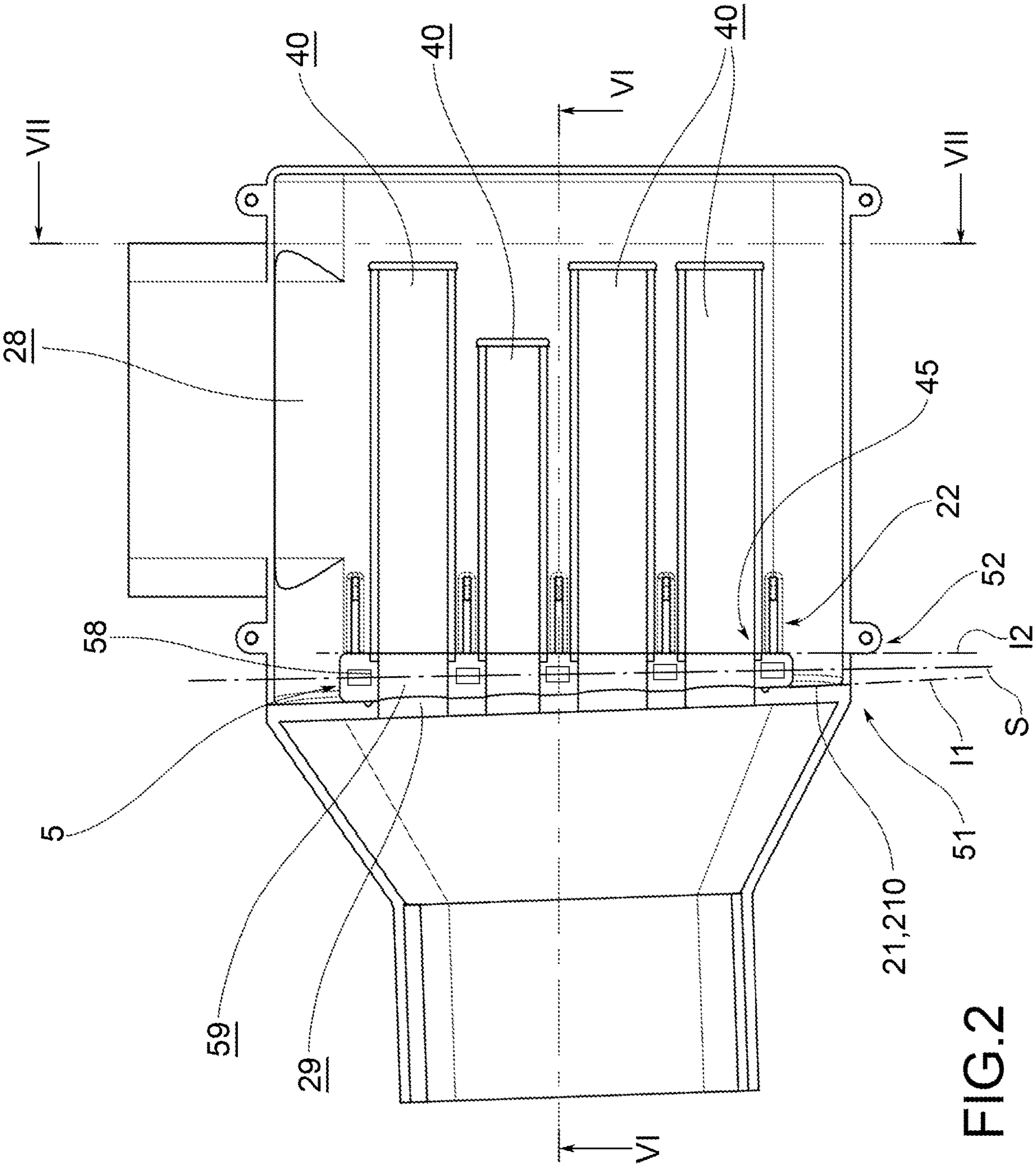
FIG. 2 shows a longitudinal sectional view of the air filtration assembly of the present invention.
Figure 3A:
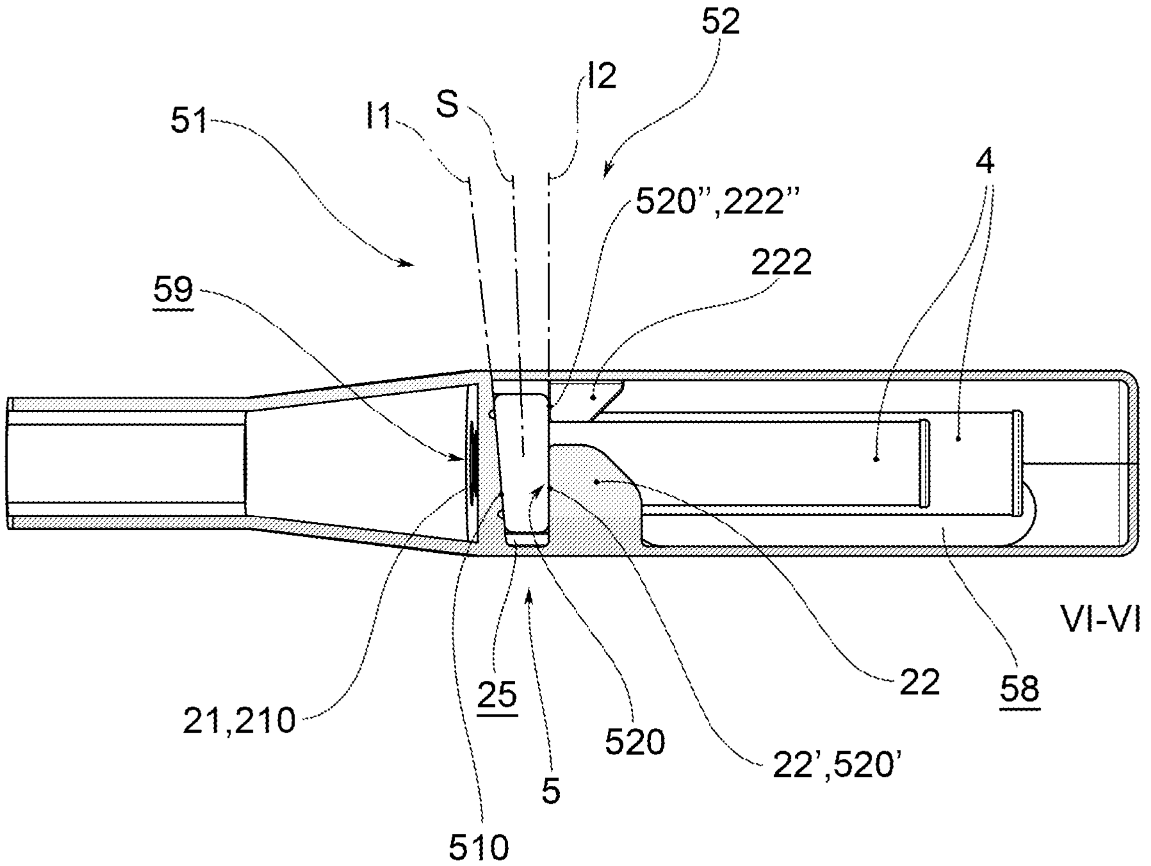
FIGS. 3*a* and 3*b* show a view along the section plane VI-VI and a view along the section plane VII-VII in FIG. 2, respectively.
Figure 3B:
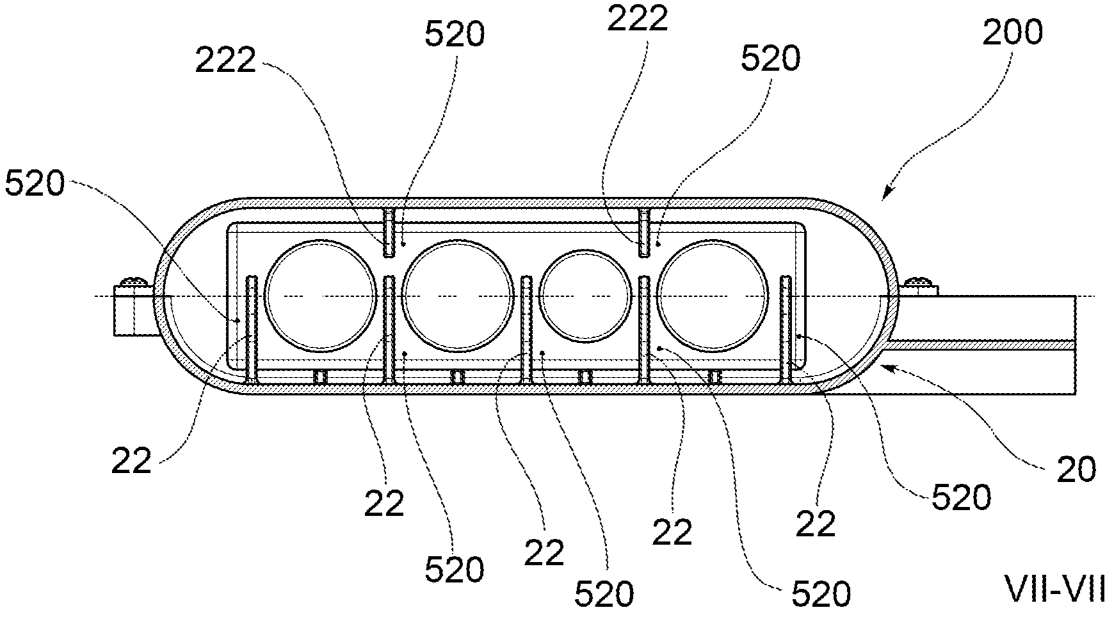
Figure 4:
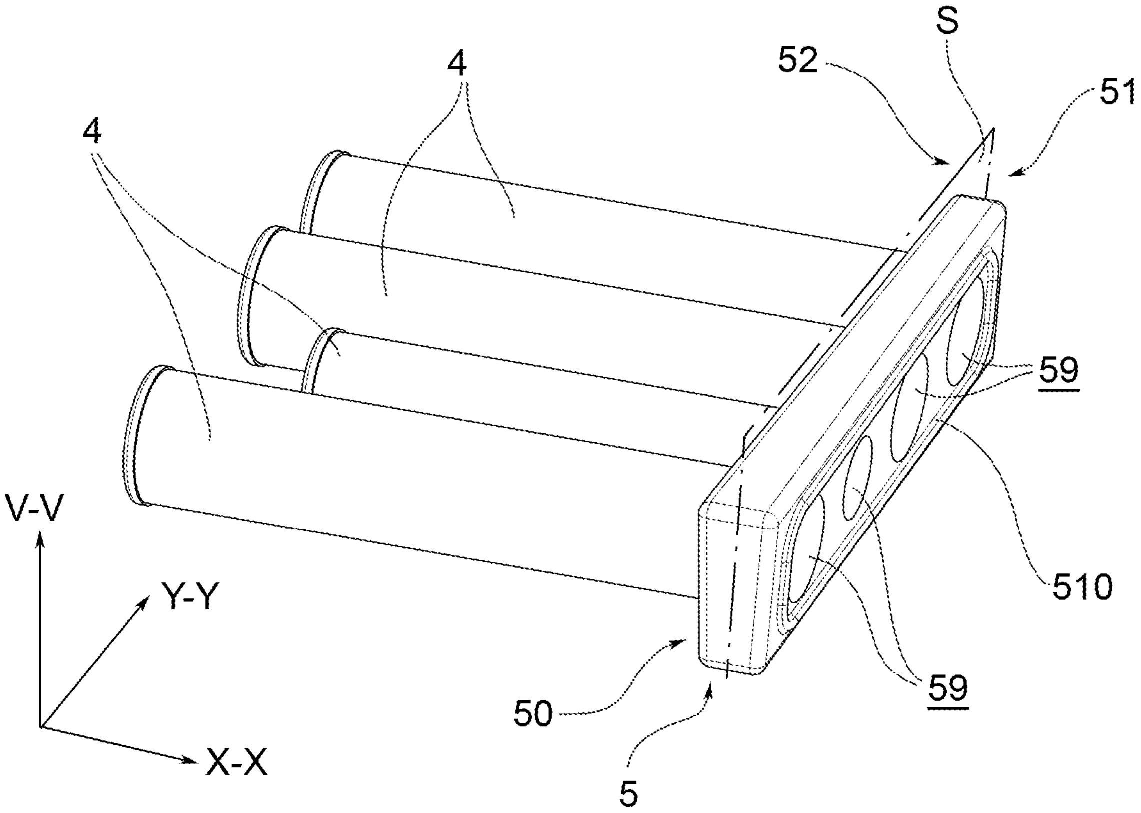
FIGS. 4' and 4" show two perspective views of a filtering cartridge comprised in the air filtration assembly in FIGS. 1*a* and 1*b*, according to a preferred embodiment.
Figure 4:
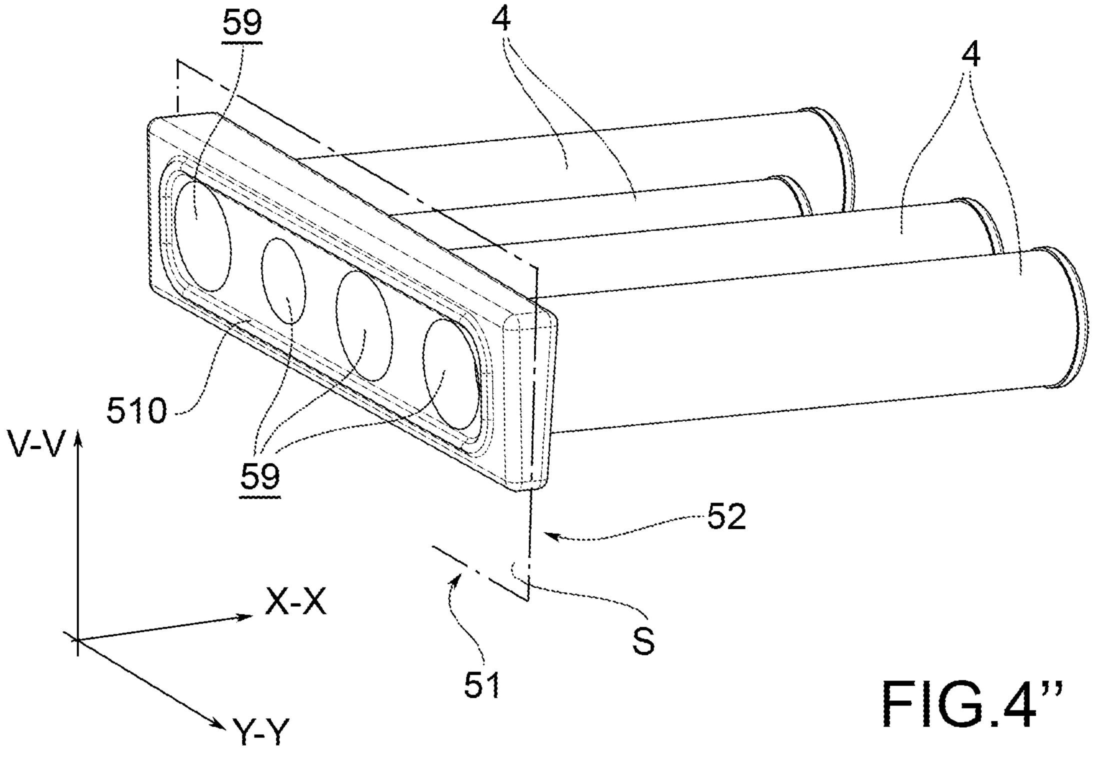
Figure 5B:
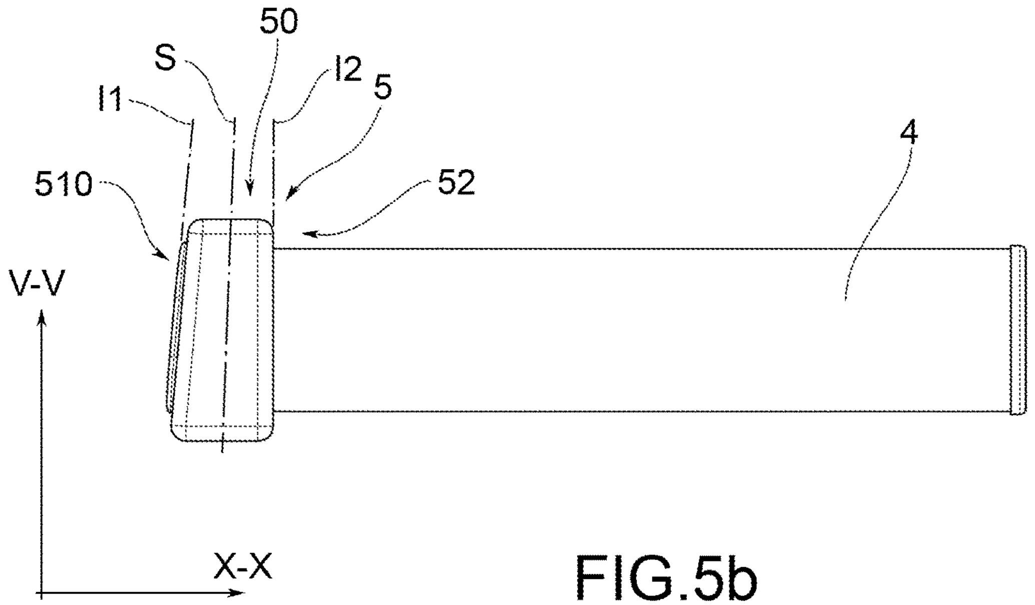
FIGS. 5*a*, 5*b*, 5*c*, 5*d* and 5*e* show a bottom view, a first side view, a top view, a second side view and a front view of the filtering cartridge in FIGS. 4' and 4"
Figure 5A:
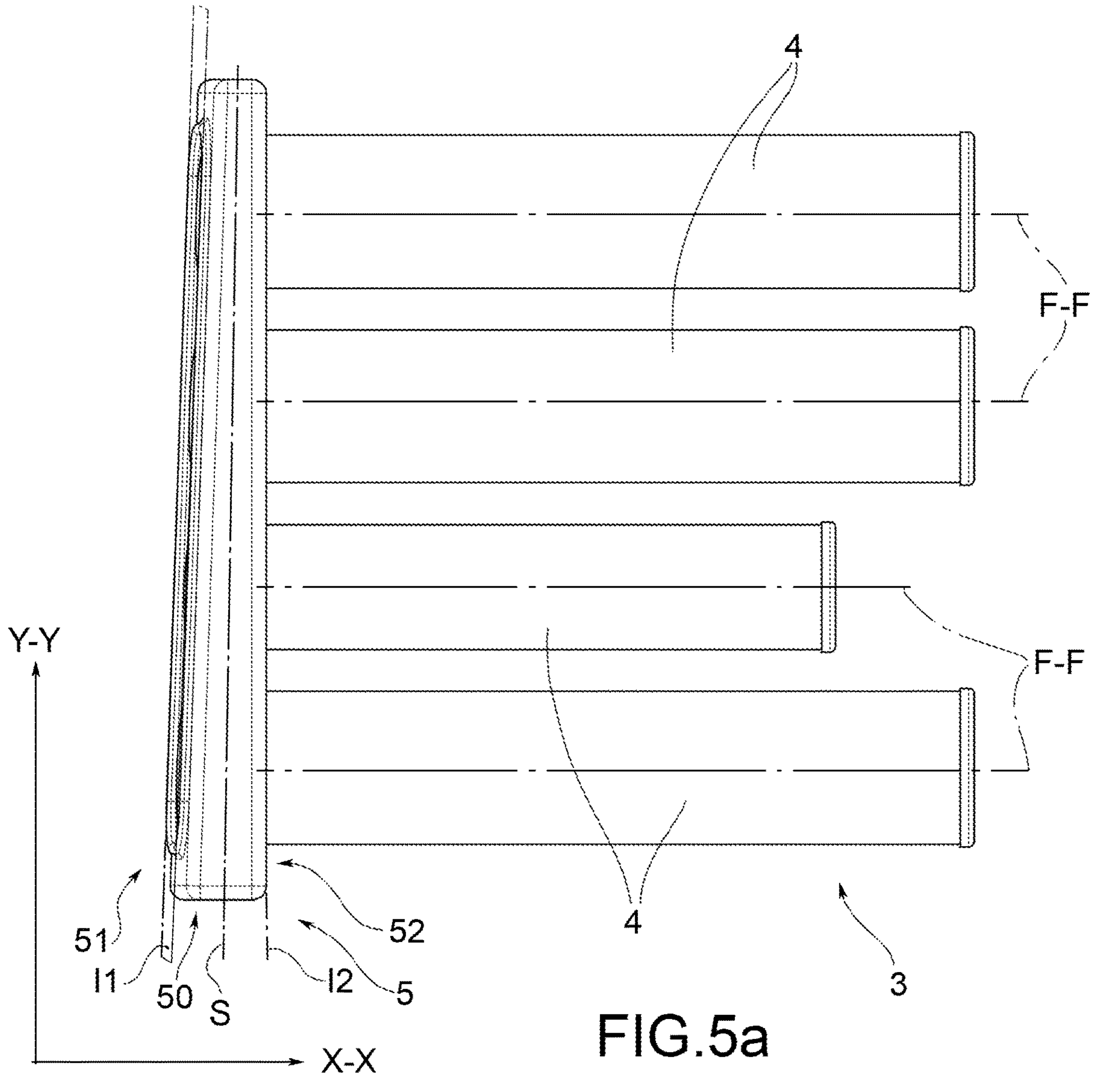
Figure 5C:
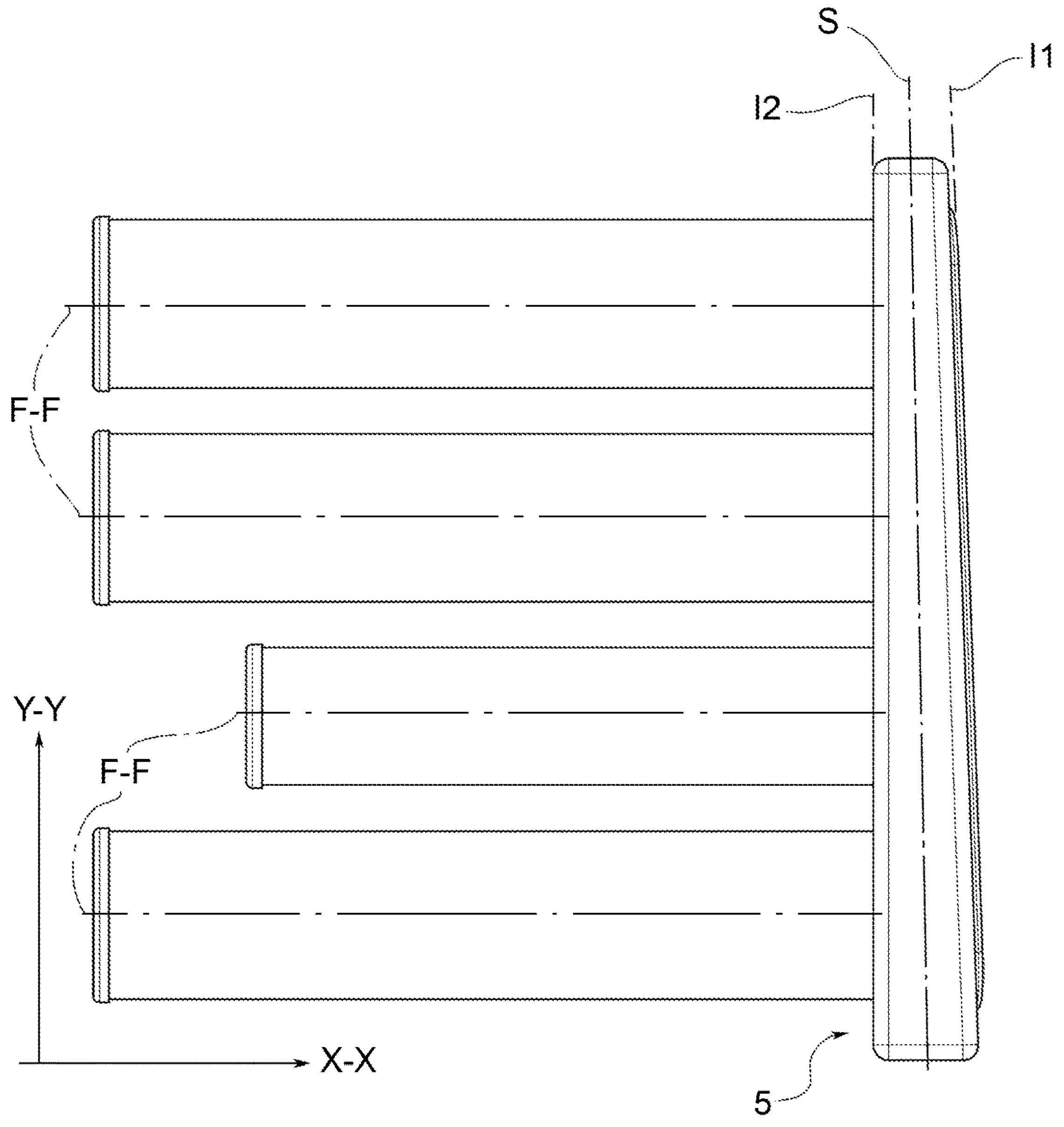
Figure 5D:
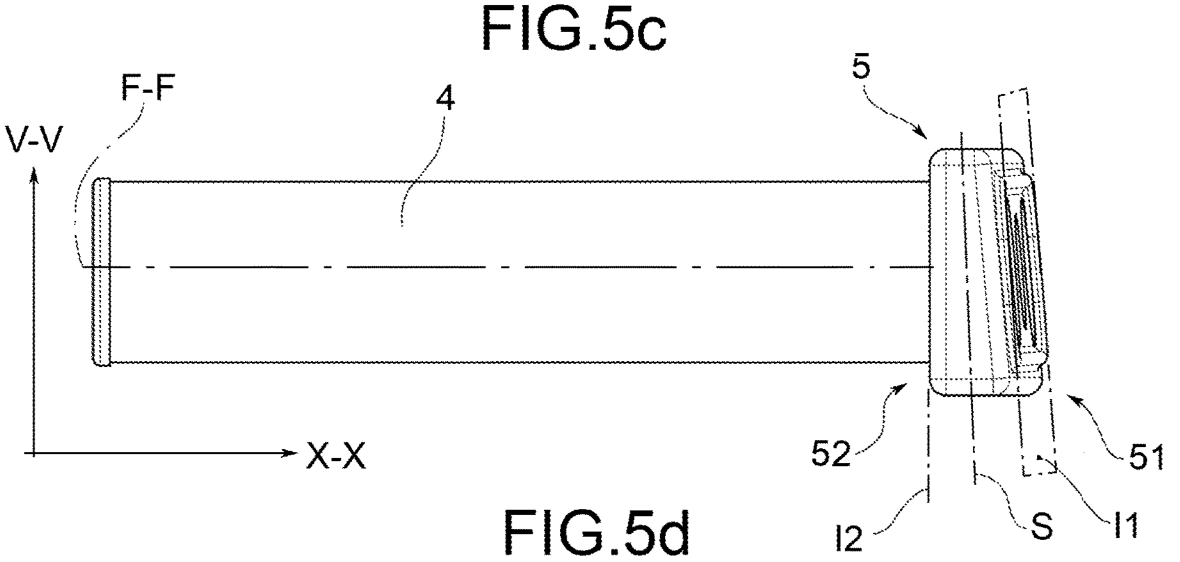
Figure 5E:
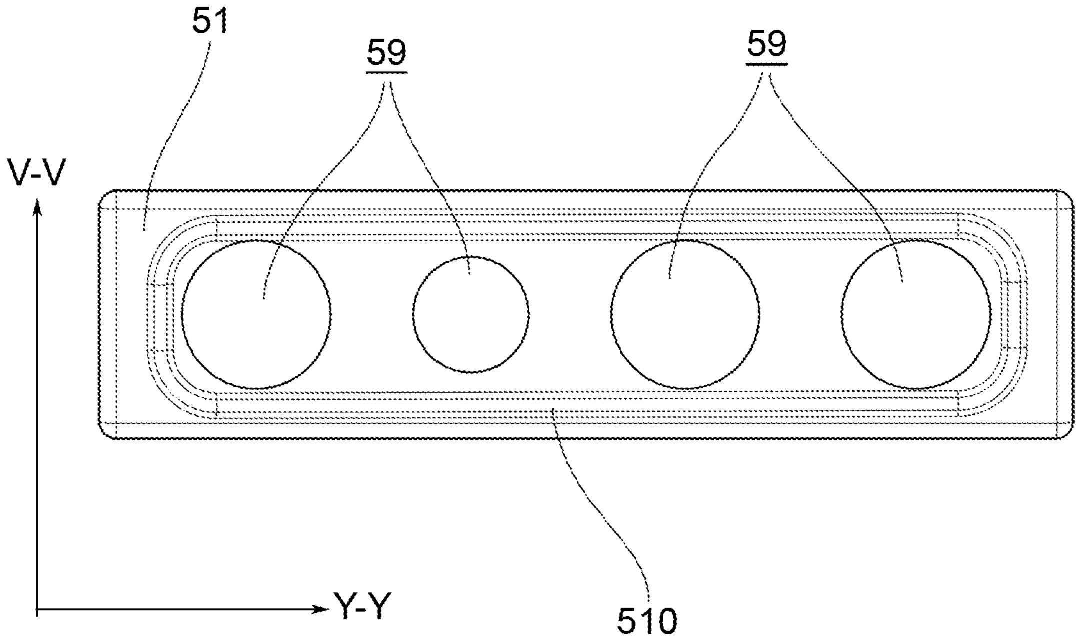
Figure 6A:
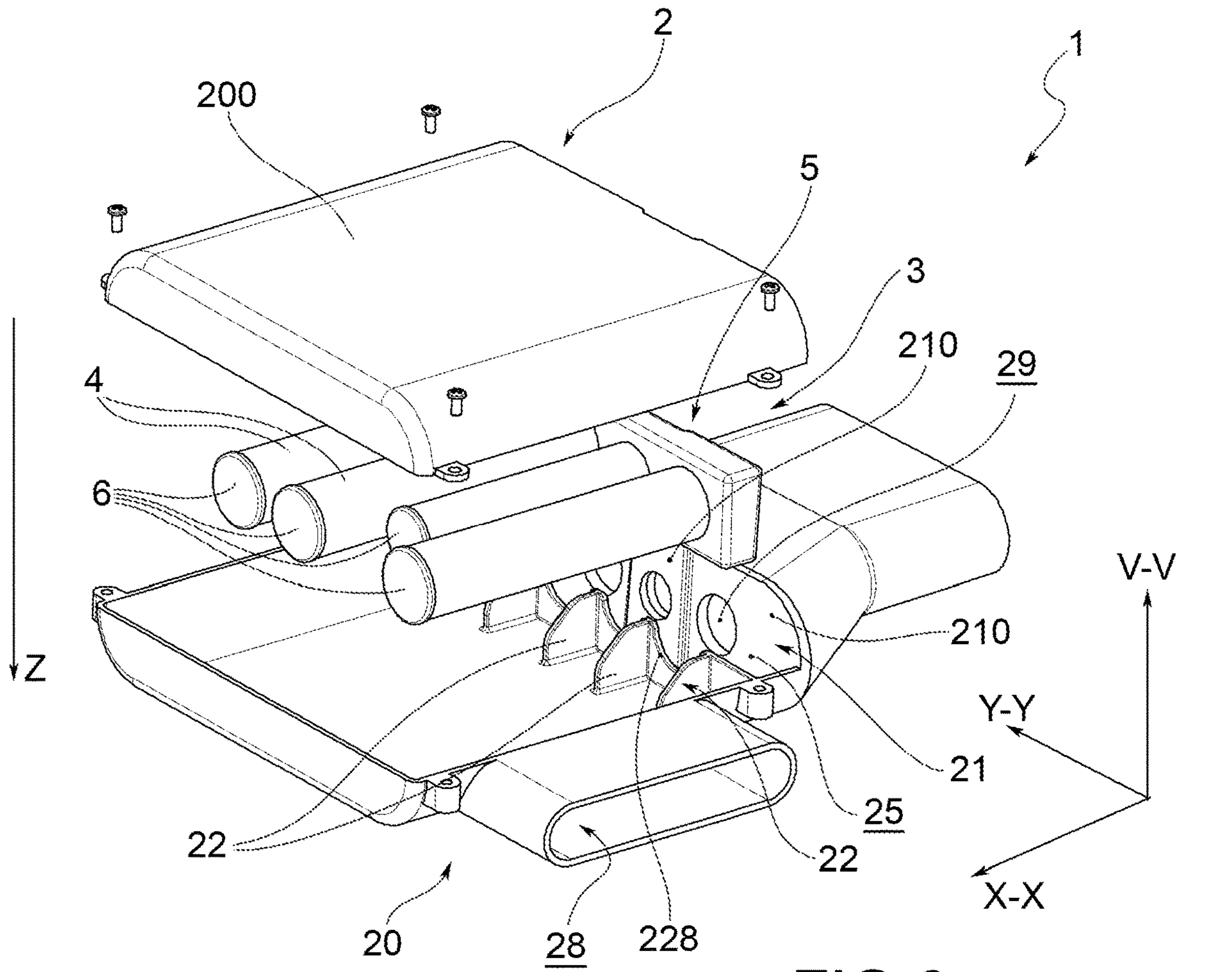
FIGS. 6*a* and 6*b* show two perspective views with separate parts of an air filtration assembly, in accordance with a second preferred embodiment.
Figure 6B:
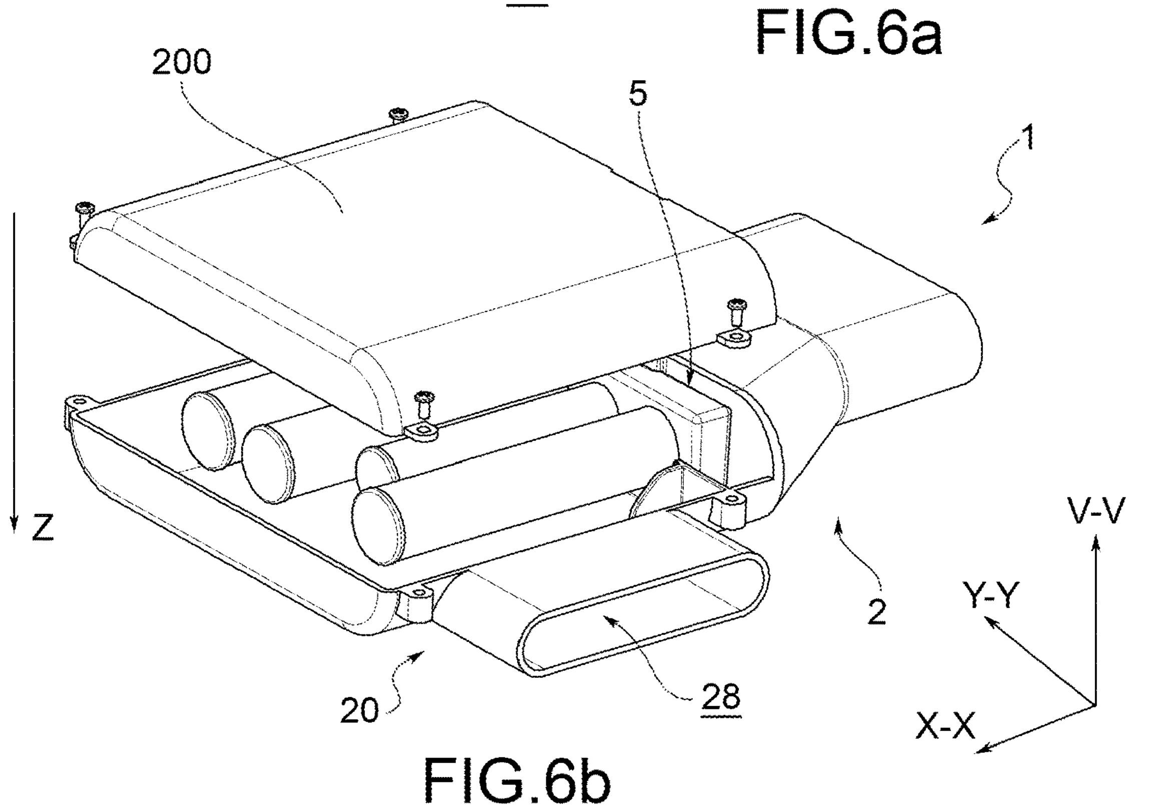
Figure 7:
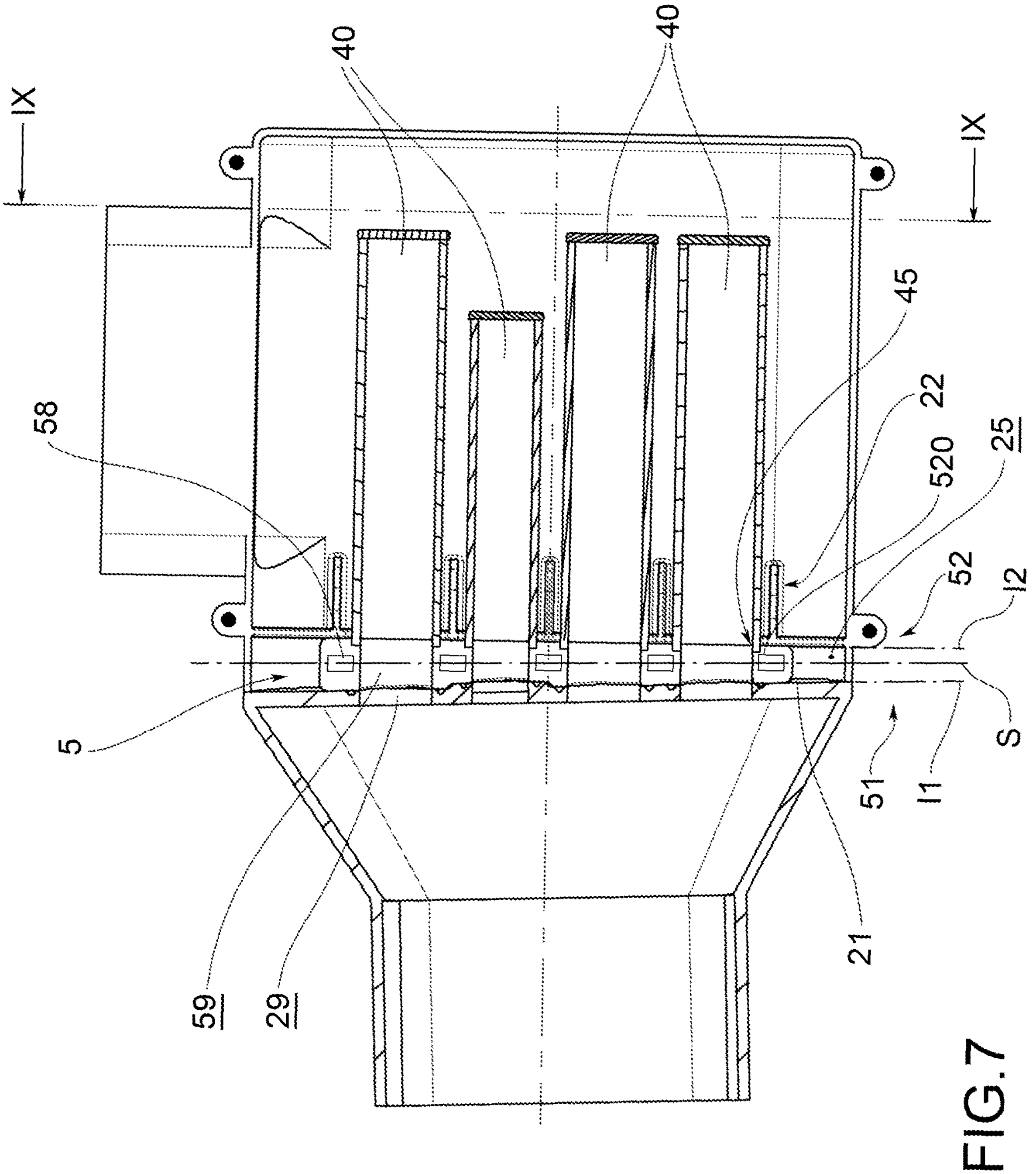
FIG. 7 shows a longitudinal sectional view of the air filtration assembly of the present invention.
Figure 7A:
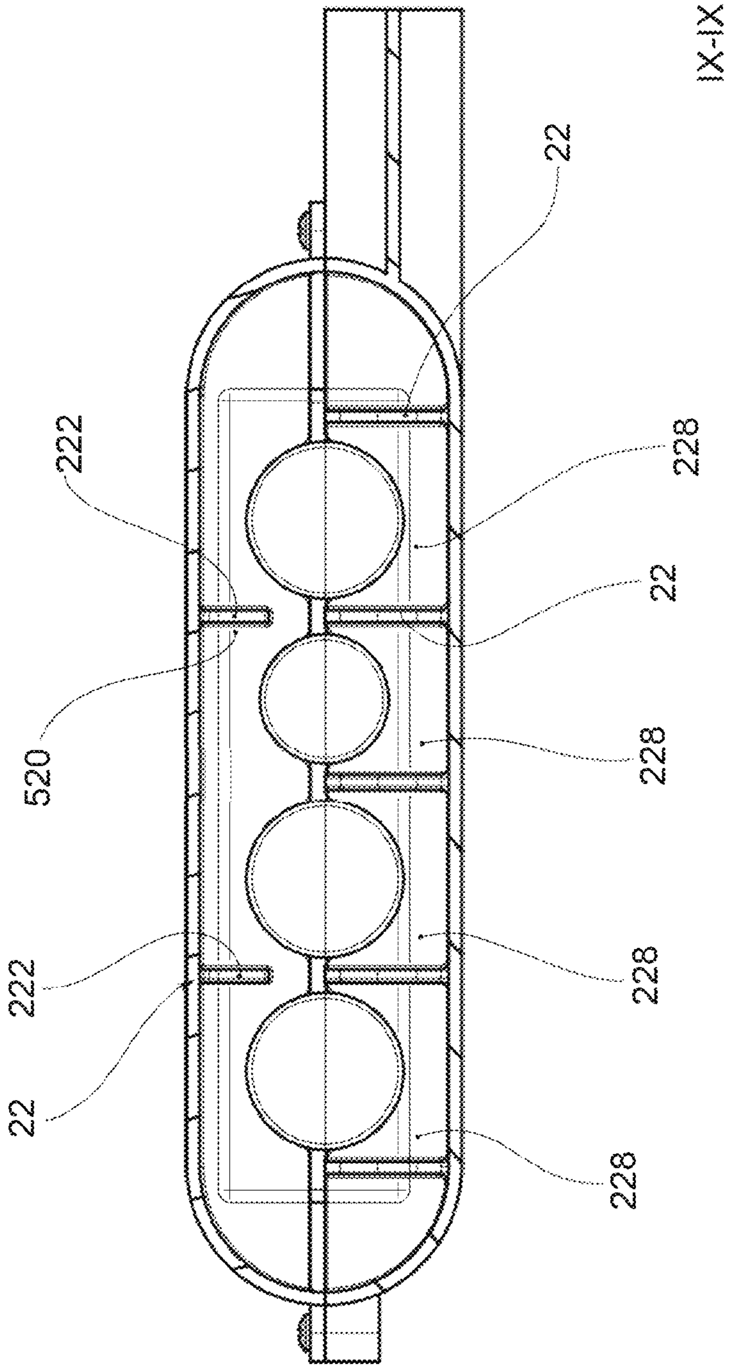
FIG. 7*a* shows a view along the section plane IX-IX in FIG. 7, respectively.
Figure 8:
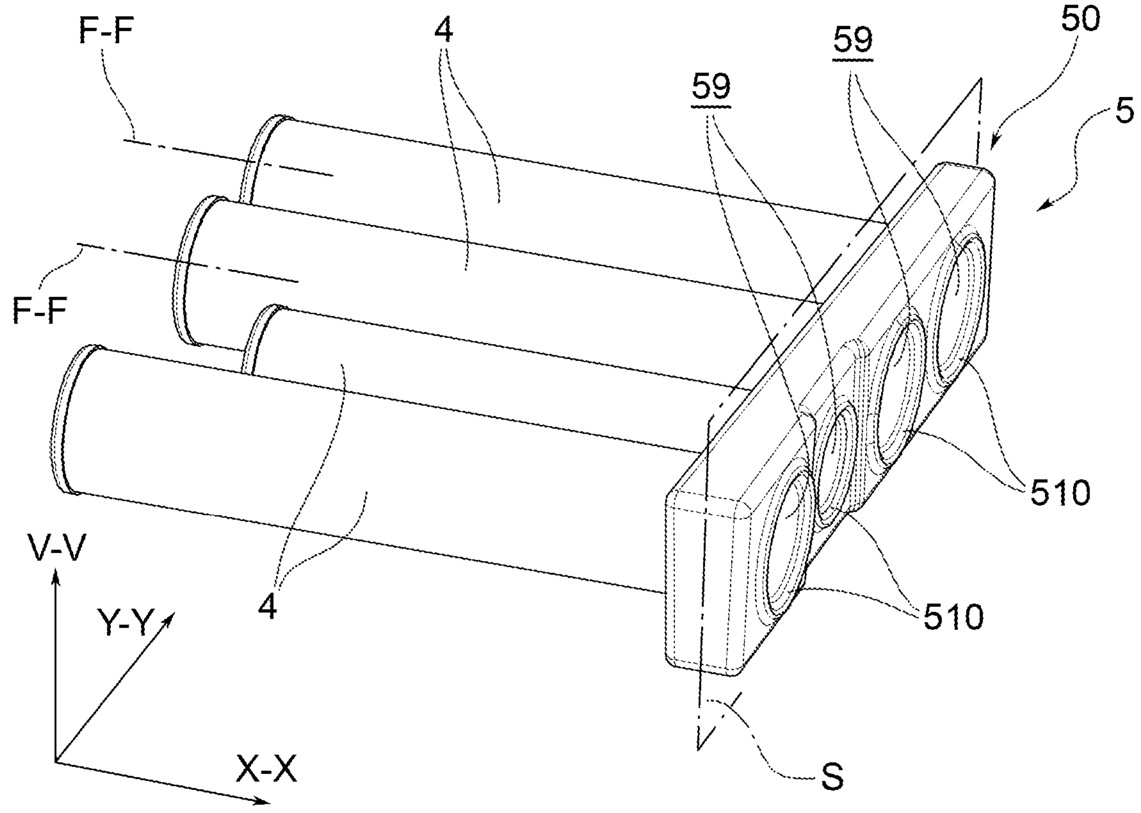
FIGS. 8' and 8" show two perspective views of a filtering cartridge comprised in the air filtration assembly in FIGS. 6*a* and 6*b*, according to a preferred embodiment.
Figure 8:
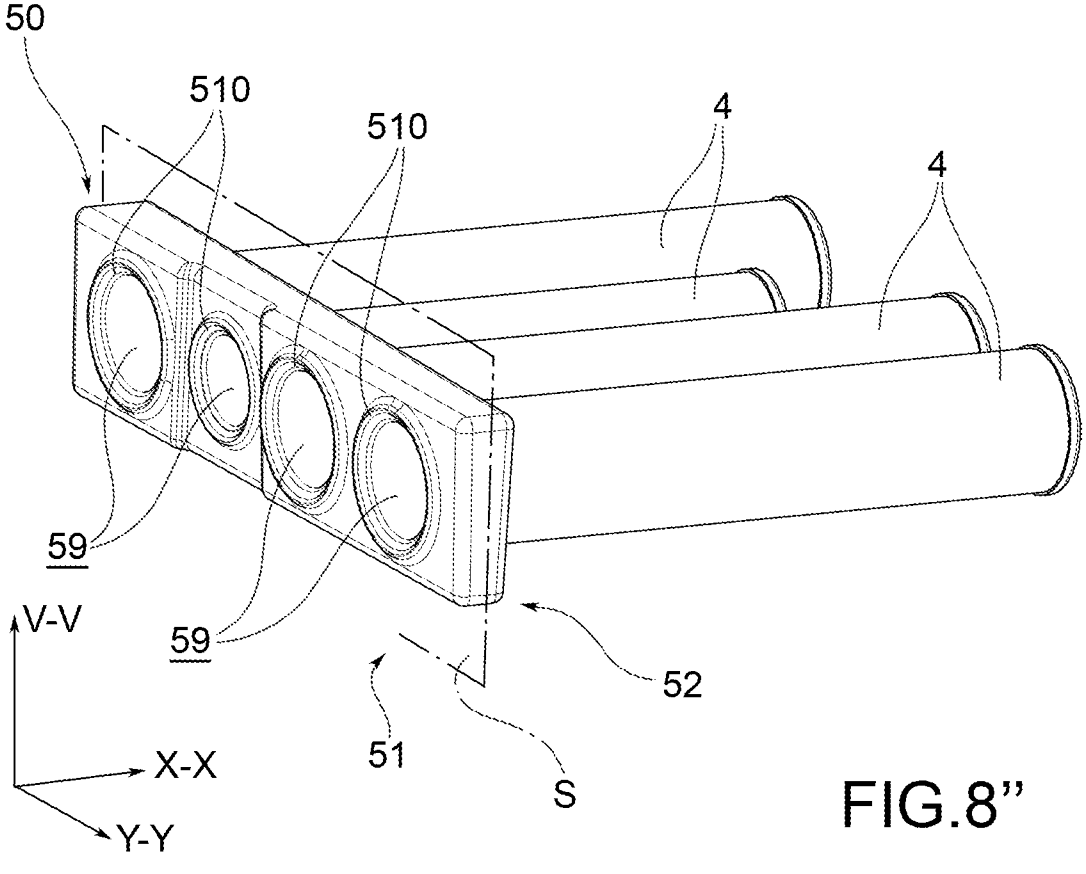
Figure 9B:
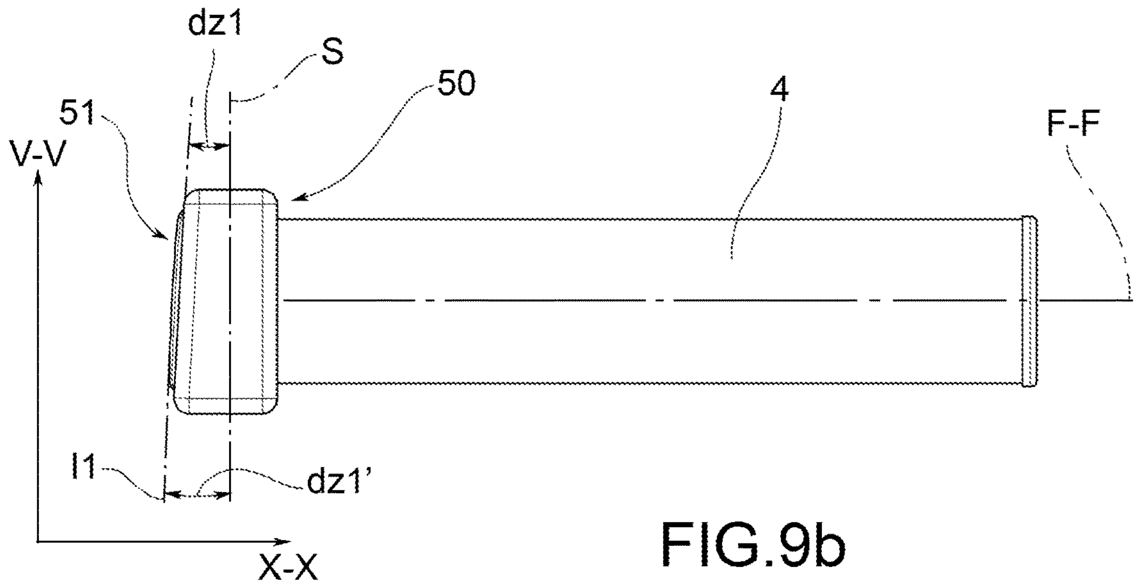
FIGS. 9*a*, 9*b*, 9*c*, 9*d* and 9*e* show a bottom view, a first side view, a top view, a second side view and a front view of the filtering cartridge in FIGS. 8' and 8".
Figure 9A:
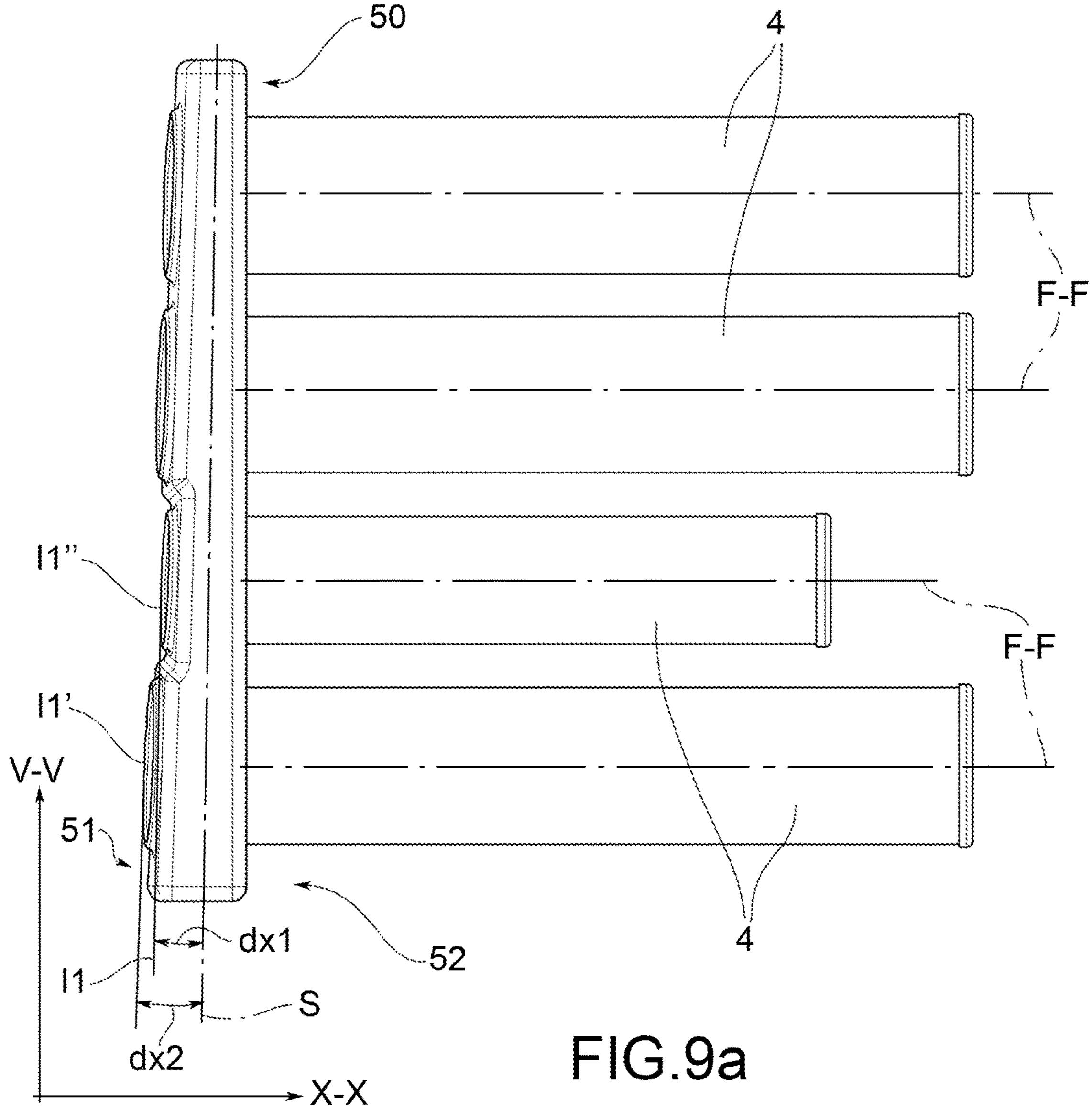
Figure 9C:
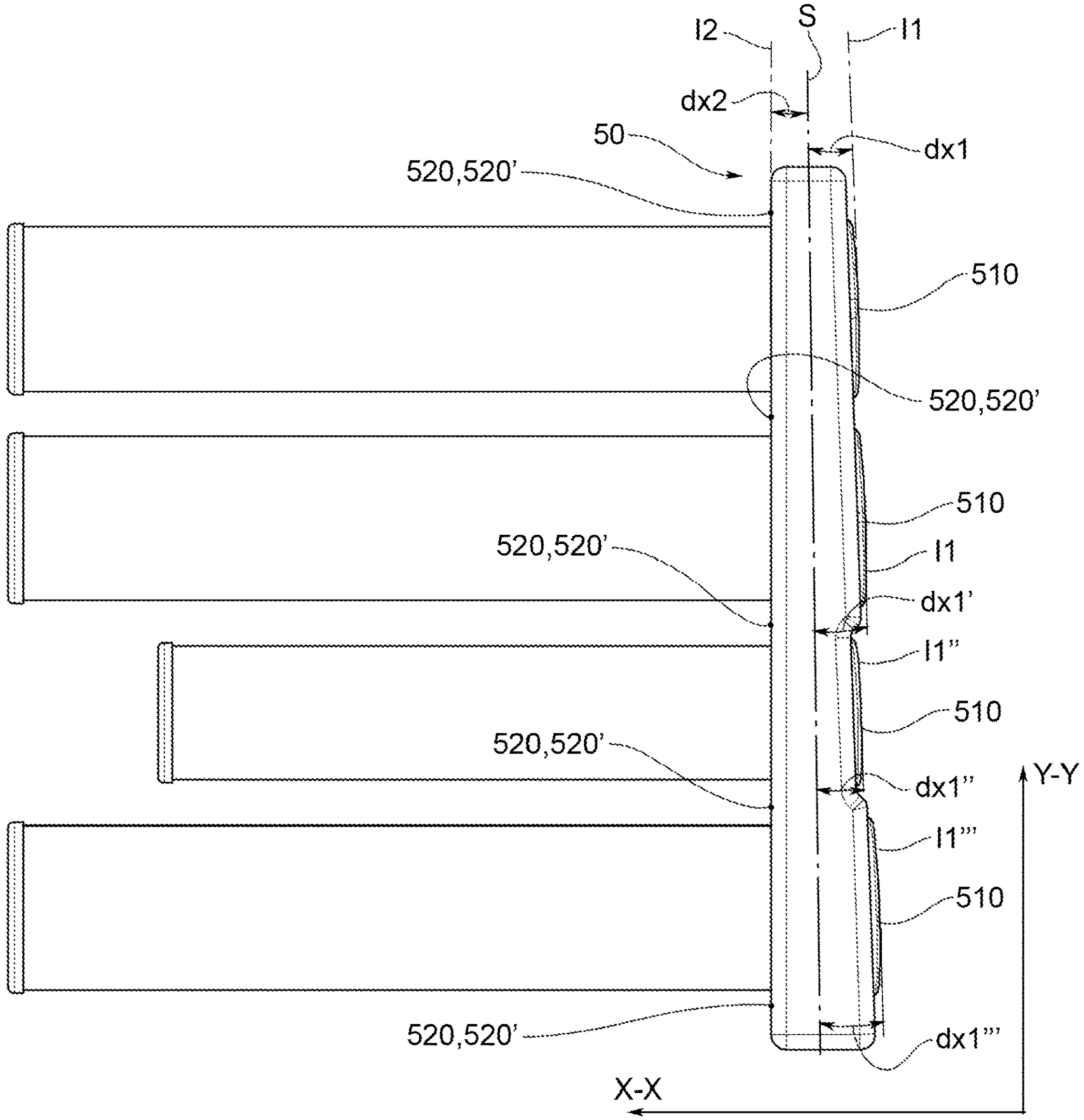
Figure 9D:
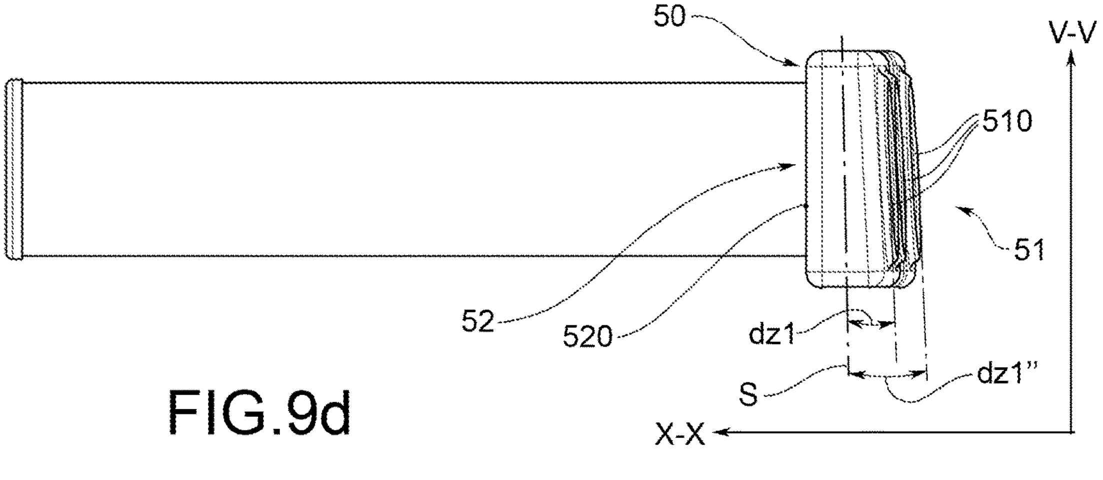
Figure 9E:
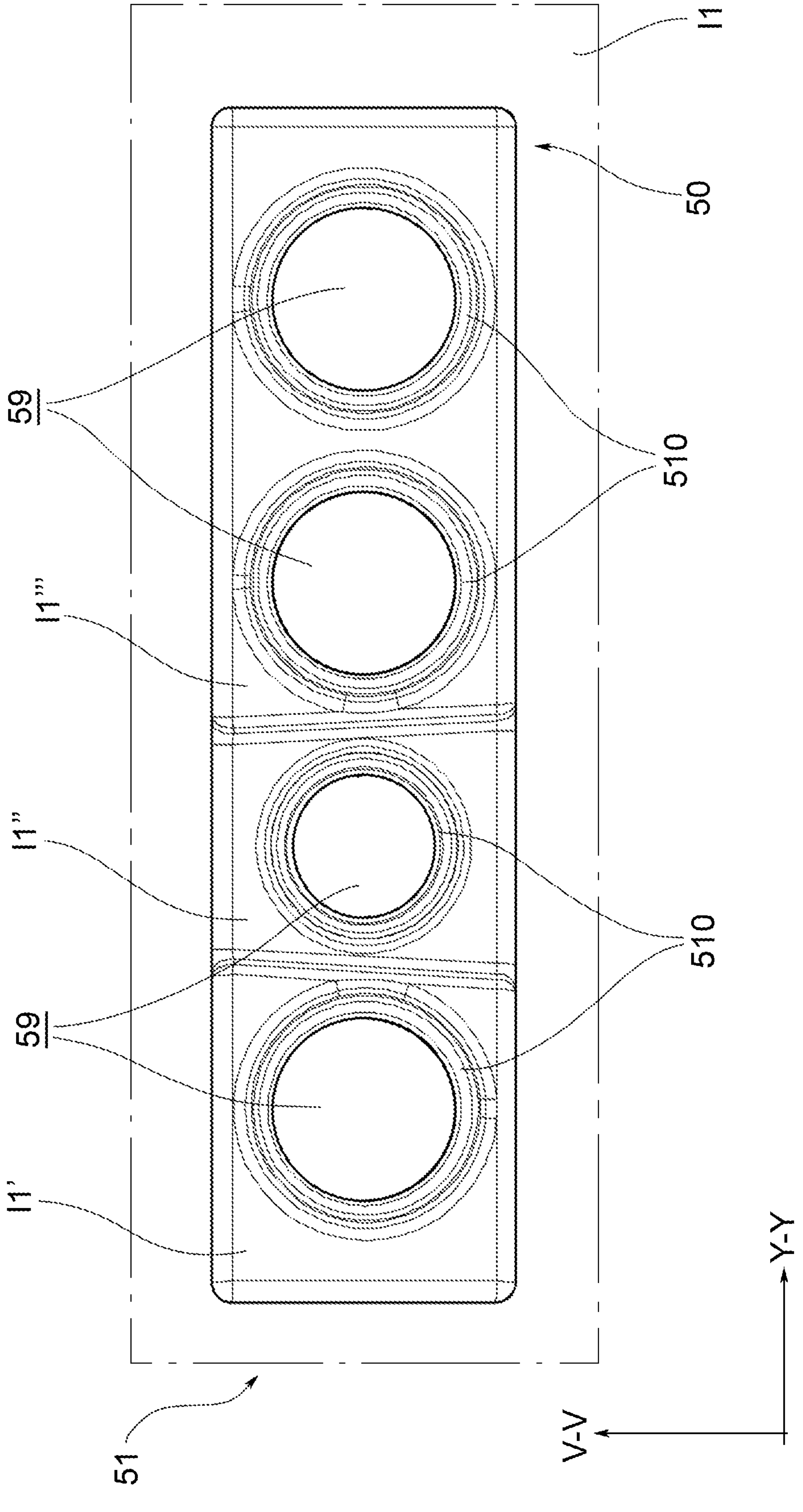
Figure 10A:
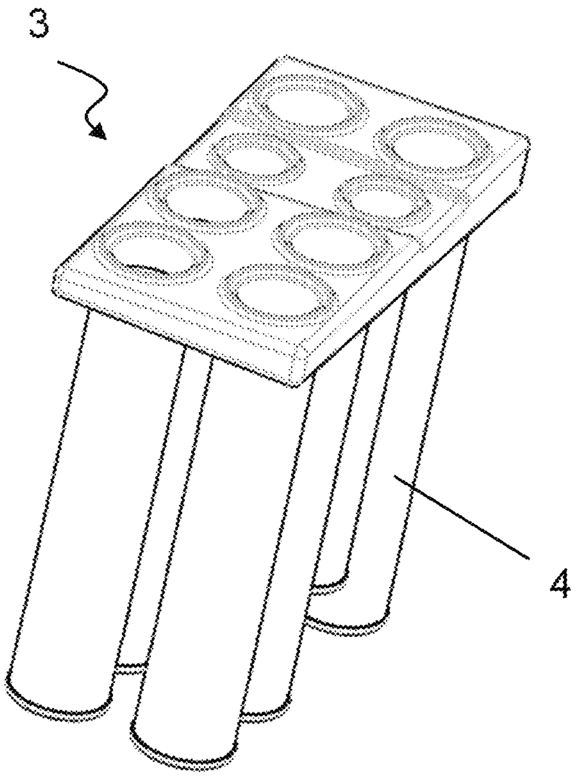
FIGS. 10*a* and 10*b* show perspective views of filtering partition rows of the air filtration assembly.
Figure 10B:
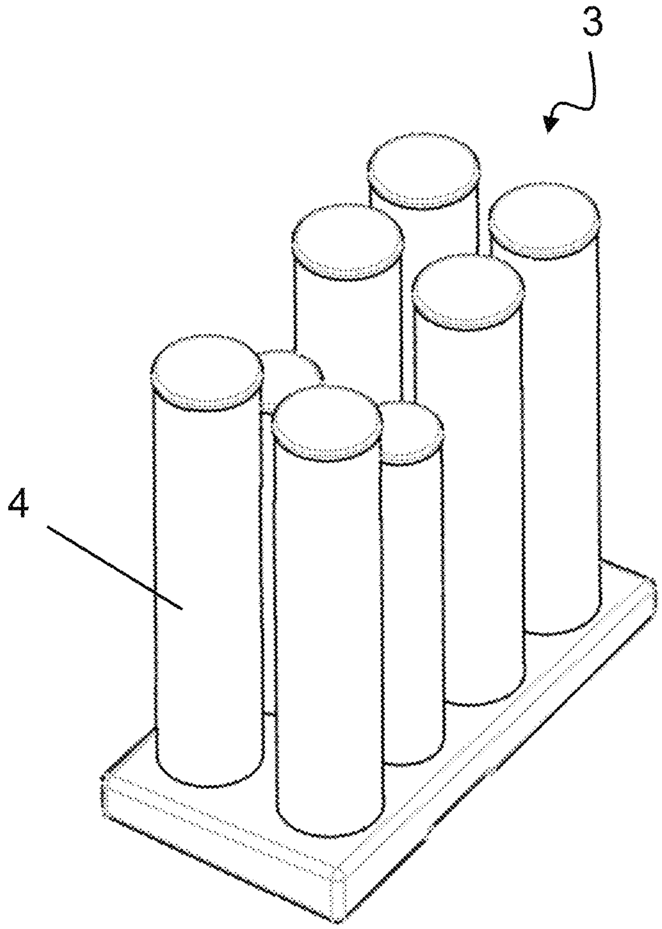

In the accompanying figures, reference numeral 1 indicates an air filtration assembly in accordance with the present invention.

In accordance with the present invention, the air filtration assembly 1 is suitable for being part of a vehicle. In particular, the air filtration assembly 1 is suitable for being part of the engine air supply system of a vehicle. Preferably, the air filtration assembly 1 is thus connectable to an air intake manifold of a vehicle. Preferably, the air filtration assembly 1 is fluidically connectable to the combustion chamber of a combustion engine of a vehicle by means of said air intake manifold.

Preferably, the air filtration assembly 1 is crossable in suction by the ambient air. Inside the air filtration assembly 1, the ambient air is thus separated from the unwanted elements suspended therein.

As mentioned, the present invention also relates to the engine air supply system of a vehicle that comprises the air filtration assembly 1.

According to the present invention, the air filtration assembly 1 of a vehicle comprises a box 2 and a filtering cartridge 3 housed in said box 2.

Preferably, said box 2 is fluidically connectable on one side to the external environment and on the other side to an air intake manifold of the vehicle.

The air filtration occurs inside the box 2.

In accordance with the present invention, the box 2 comprises a wall 21. Preferably, said wall 21 comprises at least one outflow mouth 29 crossable by the air. Preferably, the filtered air exits the box 2 from the outflow mouth 29. Preferably, the outflow mouth 29 is fluidically connectable to the air intake manifold.

In accordance with the invention, the box 2 extends along a first axis V-V, preferably vertical, and a second axis Y-Y, preferably transverse. In accordance with a preferred embodiment, the first axis V-V is orthogonal to the second axis Y-Y.

Preferably, the wall 21 extends along said first axis V-V and said second axis Y-Y.

In accordance with the present invention, the box 2 extends along a longitudinal axis X-X as well. The longitudinal axis X-X is incident to the first axis V-V and to the second axis Y-Y. In other words, the longitudinal axis X-X extends from the wall 21. Preferably, the longitudinal axis X-X extends orthogonally with respect to the first axis V-V and the second axis Y-Y, therefore preferably, the longitudinal axis X-X is orthogonal to the wall 21.

According to a preferred embodiment, the box 2 substantially has the shape of a parallelepiped.

In accordance with a preferred embodiment, the filtering cartridge 3 comprises a plurality of tubular filtering partitions 4 and a plate group 5, to which said tubular filtering partitions 4 are integrally connected.

In accordance with the present invention, the filtering cartridge 3 comprises at least two tubular filtering partitions 4 preferably radially crossable during filtration. Preferably, the tubular filtering partitions 4 are radially crossable during filtration from the outside to the inside, so as to identify the dirty side of the filtering cartridge 3 outside the tubular filtering partitions 4 and the clean side of the filtering cartridge 3 therein, preferably in the inner cavities 40 of the tubular filtering partitions 4.

In accordance with a preferred embodiment, the filtering cartridge 3 comprises at least two tubular filtering partitions 4 positioned substantially aligned with each other along the first axis V-V or the second axis Y-Y. In other words, the at least two tubular filtering partitions 4 are positioned defining a main extension row along the first axis V-V or the second axis Y-Y, in particular along the axis incident to the insertion direction Z, described below.

According to a preferred embodiment, the filtering cartridge 3 comprises at least two parallel rows in which each row comprises at least two tubular filtering partitions 4.

In a preferred embodiment, the filtering cartridge 3 comprises at least three tubular filtering partitions 4 per row.

Preferably, each tubular filtering partition 4 comprises a respective filtering axis F-F.

In accordance with a preferred embodiment, two tubular filtering partitions 4 belonging to the same row and proximal to each other have the respective filter axes F-F, mutually offset along both the first axis V-V and the second axis Y-Y.

As said, in accordance with the present invention, furthermore, the filtering cartridge 3 also comprises a plate group 5 to which the tubular filtering partitions 4 are operatively connected. In particular, the plate group 5 is suitable for supporting the tubular filtering partitions 4.

The plate group 5 comprises a plate body 50 to which the at least two tubular filtering partitions 4 are operatively connected.

The plate group 5, in particular the plate body 50, comprises at least one outflow opening 59 suitable for putting the tubular filtering partitions 4, in particular the internal cavity 40 thereof, in fluid communication with the at least one outflow mouth 29.

According to a preferred embodiment, the plate group 5, in particular the plate body 50, comprises at least one outflow opening 59 for each tubular filtering partition 4. Preferably, the wall 21 also comprises an outflow mouth 29 at each outflow opening 59.

In other words, according to a preferred embodiment, the outflow opening 59 is a duct extending longitudinally between a second face 52 and a first face 51, described below. Preferably, the plate group 5, in particular the plate body 50, comprises a number of ducts equal to the number of tubular filtering partitions 4.

In accordance with an alternative embodiment, the at least one outflow opening 59 has a shape such as to extend longitudinally between the second face 52 and the first face 51 to fluidically connect the tubular filtering partitions 4 to the at least one outflow mouth 29. In other words, in such an embodiment, the outflow opening 59 is an internal fluid manifold suitable for connecting the tubular filtering partitions 4 with the at least one outflow mouth 29. Preferably, therefore, the outflow opening 59 has a number of fluid passages on the second face 52 equal to the number of tubular filtering partitions 4 and a plurality of fluid passages on the first face 51, for example comprising a number of fluid passages on the first face 51 equal to the number of outflow mouths 29 present in the wall 21.

According to the present invention, the plate group 5, in particular the plate body 50, extends with respect to an imaginary development plane S.

Preferably, said imaginary development plane S is positioned at the center-line of the thickness of the plate group 5.

In accordance with the present invention, on the opposite sides of said imaginary development plane S, the plate group 5, in particular the plate body 50, comprises a first face 51 and a second face 52. The first face 51 is also called the sealing face. The second face 52 is also called the abutment or thrust face.

In accordance with a preferred embodiment, the at least two tubular filtering partitions are operatively connected to the plate body 50 of the plate group 5.

According to a preferred embodiment, the at least two tubular filtering partitions 4 are integrally connected to the plate group 5.

Preferably, in accordance with a preferred embodiment, the at least two tubular filtering partitions 4 are integrally connected to the second face 52. Preferably, each tubular filtering partition 4 comprises an end 45 embedded in the plate body 50.

According to the present invention, the first face 51 comprises at least one sealing profile 510.

According to a preferred embodiment, the plate group 5 comprises a single sealing profile 510 extending around the outflow opening 59 or the outflow openings present in the plate group 5, identifying a single sealing region through the engagement with the wall 21.

In accordance with a preferred embodiment, for each outflow opening 59, the plate group 5 comprises a respective sealing profile 510 extending around the respective outflow opening 59. In other words, for example, embodiments of the filtering cartridge 3 in which the plate group 5 comprises three outflow openings 59 comprise three sealing profiles 510 identifying three sealing regions.

In some embodiments, the plate group 5 comprises sealing profiles 510 extending around a plurality of outflow openings 59. For example, a sealing profile 510 extends around a plurality of outflow openings 59, preferably mutually aligned.

According to a preferred embodiment, the sealing profile 510 is integrated in the plate body 50. In particular, the sealing profile 510 is a sealing collar or lip integrally formed with the plate body 50, for example in the same material as the plate body 50.

Preferably, the sealing profile 510 acts in an axial direction (in a direction parallel to the longitudinal direction X-X).

Preferably, in the case of several sealing profiles 510, each sealing profile 510 acts in an axial direction (in a direction parallel to the longitudinal direction X-X).

According to the present invention, the second face 52 comprises at least two abutment profiles 520.

Preferably, said abutment profiles 520 are positioned axially mutually spaced apart.

According to the present invention, the abutment profiles 520 are mutually spaced apart with respect to the first axis V-V or with respect to the second axis Y-Y so that at least one tubular filtering partition 4 is positioned between two consecutive abutment profiles 520 (along the first axis V-V or the second Y-Y axis).

In a preferred embodiment, the abutment profiles 520 are regions belonging to the second face 52.

In some preferred embodiments, the abutment profiles 520 protrude or are recessed with respect to a second planar imaginary plane I2.

In accordance with a preferred embodiment, the abutment profiles 520 are in a number such as to comprise end abutment profiles 520, axially distal, and at least one central abutment profile positioned between the two end abutment profiles.

Preferably, an abutment profile 520 is positioned between two consecutive tubular filtering partitions 4.

In the embodiments, comprising three tubular filtering partitions 4, preferably per row, two end abutment profiles 520 and two central abutment profiles 520 are identified, so that a central abutment profile 520 is positioned between the first and second tubular filtering partitions 4, and the other central abutment profile 520 is positioned between the second and third tubular filtering partitions 4.

According to the present invention, the filtering cartridge 3 is insertable into the box 2 along an insertion direction Z substantially parallel to the first axis V-V or the second axis Y-Y.

In other words, the filtering cartridge 3 is insertable into the box with an insertion operation in a single insertion direction.

In accordance with a preferred embodiment, the tubular filtering partitions 4 and the rows of tubular filtering partitions 4 extend in particular along the axis incident to the insertion direction Z: preferably, the tubular filtering partitions 4 and the rows of tubular filtering partitions 4 extend orthogonally to the insertion direction Z.

In accordance with a preferred embodiment, the insertion direction Z is substantially the first axis V-V corresponding to the vertical direction, so that the insertion operation also benefits from the action of the force of gravity.

In accordance with other embodiments (not shown in the accompanying drawings), the rows of tubular filtering partitions 4 extend parallel to the insertion direction Z.

In accordance with the present invention, the box 2 comprises a housing region 25 between the wall 21 and at least two abutment elements 22 longitudinally spaced apart from the wall 21 and mutually axially spaced apart.

The plate group 5 is housed in said housing region 25 with the at least one sealing profile 510 sealingly engaged with the wall 21 and the abutment profiles 520 engaged with the respective abutment elements 22.

Preferably, the abutment elements 22 comprised in the box 2 are in number and position as a function of the abutment profiles 520 comprised on the plate group 5.

In other words, in said housing region 25, the plate group 5 is insertable by an axial insertion operation along the insertion direction Z so that the plate group 5 sealingly engages the wall 21 with the first face 51 and so that it is engaged by the abutment elements 22 on the second face 52. Preferably, the abutment on the second face 52 involves an axial thrust, in the longitudinal direction, such as to thrust and keep the first face 51 in a thrust action on the wall 21.

In accordance with the present invention, the plate body 50 is a single component made of an elastically yielding material and, in a configuration of a plate group 5 housed in the housing region 25, the plate body 50 is subjected to a volume compression.

According to a preferred embodiment, the at least one sealing profile 510 is made integrally with the plate body 50, so that, in the configuration of the plate group 5 housed in the housing region 25, at least said sealing profile 510 is subjected to a volume compression.

In accordance with a preferred embodiment, the plate body 50 is subjected to a volume compression due to the thrust interaction of the second face 52, in particular of the abutment profiles 520, with the abutment elements 22 and the consequent tightening of the first face 51 with the wall 21, in particular of the at least one sealing profile 510 with the wall 21.

In accordance with the present invention, the plate body 50 is a single component made of an elastically yielding material configured to allow the installation of the filtering cartridge upon a volume compression imposed on the plate body 50 due to the positioning thereof inside the respective housing seat 25 provided in the box.

In accordance with a preferred embodiment, the plate body 50 is a single component made of polyurethane.

In accordance with a preferred embodiment, the plate body 50 is a single component made of a closed-cell polyurethane foam.

In accordance with a preferred embodiment, the plate body 50 is a single component made of a closed-cell polyurethane foam having a Shore A hardness between 50 and 75, preferably between 55 and 65.

Advantageously, the plate body 50 is made of an elastomeric material having adequate hardness, necessary to ensure the watertight coupling of the cartridge to the box, limiting the forces required for the installation and correct tightening of the sealing profile, and simultaneously adequate mechanical resistance necessary to structurally support the tubular filtering partitions.

In accordance with a preferred embodiment, the plate group 5 comprises an internal reinforcing structure 58, in which the plate body 50 covers said internal reinforcing structure.

As fully described below, the plate group 5 (in particular some of the components thereof) and complementarily the housing region 25 are mutually specially shaped in both a longitudinal direction and in a direction parallel to the insertion direction. In particular, therefore, such a coupling allows a single/unique mutual positioning.

According to a preferred embodiment, in accordance with the present invention, the at least one sealing profile 510 is shaped with respect to the imaginary development plane S having vertical variable distances dz1, dz1' measured in a direction orthogonal to the insertion direction Z, along said insertion direction Z.

That is to say that the sealing profile 510 is shaped so as to have specific portions at a first vertical distance dz1 from the imaginary development plane S and other portions at a different vertical distance dz1' from the imaginary development plane S.

Or according to a preferred embodiment, in accordance with the present invention, the sealing profiles 510 are mutually positioned with respect to the imaginary development plane S having vertical variable distances dz1, dz1' measured in a direction orthogonal to the insertion direction Z, along said insertion direction Z.

That is to say that comprising a plurality of sealing profiles 510, each sealing profile 510 is positioned so as to be at a specific vertical distance from the imaginary development plane S. Preferably, therefore, two consecutive sealing profiles 510, in the direction parallel to the insertion direction Z, are located at two different distances from said imaginary development plane S. Preferably, the lower sealing profiles 510 or the lower portions of the sealing profiles 510, which in the insertion operations are the first to access the box 2, are located in a position preferably proximal to the imaginary development plane S with respect to the upper sealing profiles 510 or to the upper portions of the sealing profiles 510.

In accordance with what has been described above in relation to the shape and position of the sealing profiles 510, the wall 21 is specially, complementarily, shaped.

In accordance with a preferred embodiment, in accordance with the present invention, the abutment profiles 520 are shaped with respect to the imaginary development plane S having vertical variable distances measured in a direction orthogonal to the insertion direction Z, along said insertion direction Z.

That is to say that the abutment profile 520 is shaped so as to have specific portions at a first vertical distance dz2 from the imaginary development plane S and other portions at a different vertical distance from the imaginary development plane S.

Furthermore, in accordance with a preferred embodiment of the present invention, the abutment profiles 520 are mutually positioned with respect to the imaginary development plane S having vertical variable distances measured in a direction orthogonal to the insertion direction Z, along said insertion direction Z. In other words, the abutment profiles have a "serrated profile".

In accordance with what has been described above in relation to the shape and position of the abutment profiles 520, the abutment elements 22 are specially, complementarily, shaped.

According to a preferred embodiment, the abutment profiles 520 and the abutment elements 22 comprise respective abutment and thrust surfaces 520', 22' mutually slidingly engageable during the operations of inserting the cartridge 3 into the box 2.

Preferably, the abutment and thrust surfaces 520', 22' are shaped so that the cartridge 3 undergoes a thrust or abutment action, so as to remain held in position, towards the wall 21.

Preferably, the abutment and thrust surfaces 520', 22' are shaped so that the cartridge 3 undergoes a thrust action such as to determine a volume compression of the plate body 50, so as to remain held in position, towards the wall 21

In other words, according to the present invention, the plate group 5, sectioned orthogonally with respect to the imaginary development plane S, has elements, or portions of elements, proximal to said imaginary development plane S and elements, or portions of elements, distal from said imaginary development plane S. In other words, according to the present invention, the plate group 5 sectioned orthogonally with respect to the imaginary development plane S has, on the first face 51 and/or the second face 52, elements, or portions of elements, proximal to said imaginary development plane S and elements, or portions of elements, distal from said imaginary development plane S.

According to the present invention, the plate group 5 has a shape such as to be tapered in the first region that enters, during the insertion operations, in the housing region 25. According to a preferred embodiment, the plate group has a shape such as to be tapered at the bottom.

According to a preferred embodiment, in accordance with the present invention, the at least one sealing profile 510 is shaped with respect to the imaginary development plane S having variable longitudinal distances dx1, dx1', dx1", dx1''' measured in a direction parallel to the longitudinal axis X-X, along the first axis V-V or the second axis Y-Y, preferably, along the axis orthogonal to the insertion direction Z.

That is to say that the sealing profile 510 is shaped so as to have specific portions at a first longitudinal distance dx1 from the imaginary development plane S and other portions at a different longitudinal distance dx1' from the imaginary development plane S.

Or according to a preferred embodiment, in accordance with the present invention, the sealing profiles 510 are mutually positioned with respect to the imaginary development plane S having variable longitudinal distances dx1, dx1', dx1", dx1''' measured in a direction parallel to the longitudinal axis X-X, along the first axis V-V or the second axis Y-Y, preferably, along the axis orthogonal to the insertion direction Z.

That is to say that comprising a plurality of sealing profiles 510, each sealing profile 510 is positioned so as to be at a specific longitudinal distance from the imaginary development plane S. Preferably, therefore, two mutually consecutive sealing profiles 510 are located at two different longitudinal distances.

According to a preferred embodiment, in accordance with the present invention, the abutment profiles 520 are shaped with respect to the imaginary development plane S having variable longitudinal distances dx2, dx2' measured in a direction parallel to the longitudinal axis X-X, along the first axis V-V or the second axis Y-Y, preferably, along the axis orthogonal to the insertion direction Z.

That is to say that the abutment profile 520 is shaped so as to have specific portions at a first longitudinal distance from the imaginary development plane S and other portions at a different longitudinal distance from the imaginary development plane S.

Or according to a preferred embodiment, in accordance with the present invention, the abutment profiles 520 are mutually positioned with respect to the imaginary development plane S having longitudinal variable distances measured in a direction parallel to the longitudinal axis X-X, along the first axis V-V the second axis Y-Y, preferably, along the axis orthogonal to the insertion direction Z.

That is to say that by comprising a plurality of abutment profiles 520, each abutment profile 520 is positioned so as to be at a specific longitudinal distance from the imaginary development plane S. Preferably, therefore, two mutually consecutive abutment profiles 520 along the insertion axis Z are located at two different longitudinal distances.

In other words, according to the present invention, the plate group 5 sectioned along the imaginary development plane S, has elements, or portions of elements, longitudinally proximal to said imaginary development plane S and elements, or portions of elements, longitudinally distal from said imaginary development plane S. In other words, according to the present invention, the plate group 5 sectioned orthogonally with respect to the imaginary development plane S orthogonally to the insertion direction, has elements or portions of elements on the first face 51 and/or on the second face 52 longitudinally proximal to said imaginary development plane S and elements, or portions of elements, longitudinally distal from said imaginary development plane S.

According to the present invention, the plate group 5 has a shape such as to have a variable section preferably with a tapered trend in a preferred axial direction. Or, again according to the present invention, the plate group 5 has a shape such as to have a variable section, being centrally concave or convex.

In accordance with a preferred embodiment, the first face 51 extends with respect to a first imaginary plane I1, in which said first imaginary plane I1 is a planar plane containing all the points on a continuous plane.

In accordance with a preferred embodiment, each sealing profile 510 lies on or protrudes from said first imaginary plane I1.

In accordance with a preferred embodiment, the first face 51 extends with respect to a first imaginary plane I1, in which said first imaginary plane I1 is a broken plane identifying a plurality of imaginary half-planes I1', I1", I1'".

In accordance with a preferred embodiment, in which at least one sealing profile 510 lies on or protrudes from a respective first imaginary half plane I1', I1", I1'".

According to a preferred embodiment, the second face 52 extends with respect to a second imaginary plane I2 in which said second imaginary plane I2 is a planar plane containing all the points on a continuous plane.

In accordance with a preferred embodiment, each abutment profile 520 lies on or protrudes from said second imaginary plane I2.

In accordance with an alternative embodiment, the second face 52 extends with respect to a second imaginary plane I2, in which said second imaginary plane I2 is a broken or serrated plane identifying a plurality of imaginary second half-planes.

In accordance with a preferred embodiment, in which at least one abutment profile 520 lies on or protrudes from a respective second imaginary half-plane.

According to a preferred embodiment, the second face 52 extends in a broken manner along the insertion direction Z, comprising a lower half-face and an upper half-face, in which the imaginary thrust plane I2 is a broken plane, comprising two incident imaginary half-planes.

As mentioned, the box 2 (the housing region 25 thereof) in particular, the wall 21 and the abutment elements 22 are specially shaped to be engaged by the sealing profiles 510 and the abutment profiles 520.

For example, in a preferred embodiment, with the cartridge 3 comprising a plurality of sealing profiles 510, the wall 21 is specially shaped to comprise sealing planes 210 suitable for being engaged by said sealing profiles 510.

For example, in accordance with a preferred embodiment, the wall 21 comprises a plurality of sealing planes 210 positioned on different imaginary sealing planes that, in a direction parallel to the insertion direction Z, with the filtering cartridge 3 housed, are in turn at variable longitudinal distances and variable (or respectively different) vertical distances with respect to the imaginary development plane S.

Or again, by way of example, in accordance with a preferred embodiment, the abutment elements 22 are located on different imaginary abutment planes that, with the filtering cartridge 3 housed in the box 2, therefore the plate group 5 housed in the housing region 25, are in turn at variable longitudinal distances and at variable vertical distances with respect to the imaginary development plane S.

In other words, according to the present invention, the plate group 5 observed laterally has a variable shape along the vertical axis and the plate group 5 observed from above has a variable shape along the longitudinal axis.

Preferably, at least one of the first face 51 and the second face 52 has said variable trend along the vertical axis and at least one of the first face 51 and the second face 52 has said variable trend along the longitudinal axis.

In accordance with a preferred embodiment, the box 2 comprises a container 20, in which the filtering cartridge 3 is housable at least in part and a cover 200 suitable for engaging and close the container 20.

Preferably, the cover 200 is mountable on the container 20 with a translation or rotation or roto-translation action. In accordance with a preferred embodiment, the cover 200 is mountable to the container 20 by screw or clip means.

According to a preferred embodiment, the cover 200 is suitable for engaging the filtering cartridge 3 in particular the second face 52.

Preferably, the cover 200 is suitable for engaging the plate group 5 in a direction parallel to the insertion direction.

In other words, the cover 200 is preferably suitable for acting as an axial abutment in the insertion direction.

In accordance with a preferred embodiment, the cover 200 comprises one or more abutment projections 222 suitable for engaging the second face 52 of the plate group 5 to keep the cartridge 3 in the longitudinal position thereof or to keep the cartridge 3 in a thrust action, in particular the one or more sealing profiles 510, in the longitudinal direction towards the wall 21.

In accordance with a preferred embodiment, the cover 200 comprises one or more abutment projections 222 suitable for engaging the second face 52 of the plate group 5 to increase the portion of the plate body 50 subject to volume compression and thus increase the intensity of the thrust of the filtering cartridge 3 in the longitudinal direction towards the wall 21, in particular of the at least one sealing profile 510, and the stability of the coupling between cartridge 3 and box 2.

According to a preferred embodiment, one or more abutment projections 222 engage the abutment profiles 520.

In accordance with a preferred embodiment, the abutment projections 222 have the same purpose as the abutment elements 22. Preferably, the second face 52, in particular each abutment profile 520 is shaped and/or positioned so as to interact with the lower portion thereof with the abutment element 22 and with an upper portion thereof with the abutment projection 222.

Preferably, the abutment profiles 520 and the abutment projections 222 have auxiliary abutment and thrust surfaces 520", 222".

Preferably, one or more abutment projections 222 are positioned at the central abutment profiles 520. In other words, according to a preferred embodiment, the central abutment profiles 520 have a wedge shape comprising both an abutment and thrust surface suitable for engaging the abutment elements 22 and an auxiliary abutment and thrust surface suitable for engaging the abutment projections 222.

According to a preferred embodiment, the box 2 comprises at least one inflow mouth 28. Preferably, said at least one inflow mouth 28 is longitudinally spaced apart from the at least one outflow mouth 29.

In accordance with a preferred embodiment, the container 20 and/or the cover 200 comprise directional wings suitable for directing the flow of external air towards the tubular filtering partitions 4. In other words, according to a preferred embodiment, the container 20 and/or the cover 200 comprise directional wings therein suitable for directing the flow of inlet air towards the external walls of the tubular filtering partitions 4.

In accordance with a preferred embodiment, the filtering cartridge 3 further comprises an auxiliary plate group 6. Preferably, the auxiliary plate group 6 is longitudinally opposite to the plate group 5. Preferably, the tubular filtering partitions 4 are integrally connected to the auxiliary plate group 6.

In accordance with a preferred embodiment, each tubular filtering partition 4 is engaged by a respective auxiliary plate group 6.

In accordance with a preferred embodiment, the box 2 further comprises support elements suitable for supporting the auxiliary plate group 6.

In accordance with a preferred embodiment, the plate group 5 comprises elastically yielding teeth, suitable for snap-engaging special housings provided on the container 20 or on the cover 200. Preferably, the snap engagement occurs at the end of insertion of the filtering cartridge 3 into the box 2 in the insertion direction. Preferably, the cartridge is extracted from the box 2 by performing a pulling action that overcomes the elastic action of said elastically yielding teeth.

Preferably, the elastically yielding teeth act in a direction orthogonal to the longitudinal direction X-X.

Preferably, the elastically yielding teeth are integrated in the reinforcing structure 58 of the plate group 5.

In accordance with some preferred embodiments shown, the transversely spaced abutment profiles 520 have the same shape, i.e., the same inclination (as shown in the accompanying drawings).

In accordance with some preferred embodiments, the transversely spaced abutment profiles 520 have different shapes, for example, they have different inclinations.

It should be noted that mixed embodiments are included, with respect to those shown in the accompanying drawings, remaining in accordance with the above described principles of the present invention, having the arrangement of the sealing profiles of one solution and the abutment profiles of the other.

According to a preferred embodiment, the box 2 between two abutment elements 22 comprises abutment fittings 228 suitable for engaging the second face 52 in a region between two abutment profiles 520.

According to a preferred embodiment, the box 2 between two abutment elements 22 comprises an abutment fitting 228 suitable for planarly engaging the second face 52 in a region between two abutment profiles 520.

Preferably, said abutment fittings 228 are suitable for engaging a large portion of the second face 52 by means of a thrust action.

Preferably, said abutment fittings 228 are suitable for increasing the portion of the plate body 50 subject to volume compression and thus strengthen the stability of the water-tight coupling of the filtering cartridge 3 to the box 2, in particular of the at least one sealing profile 510 to the wall 21.

In accordance with a preferred embodiment, said abutment fittings 228 are shaped to partially embrace the external surface of the tubular filtering partition 4 positioned between the two abutment profiles 520.

Innovatively, the air filtration assembly and the engine air supply system of a vehicle that comprises it, as described above, widely fulfill the purpose of the present invention, overcoming the typical problems of the prior art.

Advantageously, the air filtration assembly ensures a simple and intuitive assembly and a simple and intuitive disassembly. Advantageously, the assembly and disassembly operations of the air filtration assembly are guided and foolproof.

Advantageously, the filtering cartridge is insertable into the box according to a single insertion direction, facilitating the conduct of the maintenance procedure.

Advantageously, the filtering cartridge, but in particular the plate group thereof, is insertable in a guided manner into the box, in particular in the housing region so as to avoid damage or wear of the sealing profiles, minimizing the friction thereof with the wall and unwanted sliding.

Advantageously, the maintenance operations are guided and overcome the possibility that unwanted breakages occur in the performance thereof.

Advantageously, the positioning of the filtering cartridge ensures a safe and precise positioning of the sealing profiles, and therefore a stable, reliable sealed coupling that is resistant to vibrations and impacts.

Advantageously, the volumetric compression undergone by the plate body is obtained by a longitudinal component and by a transverse component such as to uniformly distribute the thrust action on the plate group towards the wall.

Advantageously, the abutment elements and the abutment profiles are mutually interacting so as to favor the engagement of the sealing profiles. Advantageously, the abutment elements and the abutment profiles are specially structured to exert a uniform thrust/compression of the plate body, but above all of the sealing profiles. Preferably, advantageously, the abutment elements and abutment profiles perform an effective thrust action also in a central region of the plate group.

Advantageously, the filtering cartridge effectively utilizes the spaces available next to the tubular filtering partitions and/or between adjacent tubular partitions, in particular on the second face of the plate group, to guide the cartridge into the housing region and at the same time make and maintain the seal against the wall. Advantageously, with respect to known filtering cartridges belonging to the prior art, for example comprising panel filtering media or cylindrical filtering media, the filtering cartridge of the present invention achieves this function by utilizing spaces that are usually not accessible and occupied by the filtering media.

Advantageously, the cartridge utilizes the layout flexibility offered by the tubular partitions to create an innovative guide and positioning system.

Advantageously, the abutment elements and the abutment profiles are mutually interacting so as to ensure an adequate tightening of the sealing profile (or of the sealing profiles) along the entire length of the plate group, even in the case of cartridges having a plurality of tubular partitions organized in several rows, and therefore of greater size and weight than in the case of cartridges with two tubular filtering partitions.

Advantageously, the filtering cartridge is installable inside the box by a guide/positioning system performable and maneuverable in small spaces with, for example, vertical insertion or lateral insertion. This effect allows to maximize the usage of the spaces available inside the engine compartment and facilitate the installation of the air supply system on the vehicle.

Advantageously, the positioning guide system is very compact, thus allowing to improve the usage of the spaces inside the box, increasing the usable filtering surface and reducing the pressure drops imposed on the suction circuit by the filtering system.

Advantageously, the filtering cartridge stably maintains the watertight coupling by utilizing the limited chain of tolerances involved, thus optimizing the number of components required and therefore the production costs associated with the filtering cartridge.

Advantageously, the filtering cartridge is automatically objectified by virtue of the particular shape of the plate group, facilitating the correct insertion thereof into the box and offering the operator an immediate visual recognition system.

Advantageously, in order to function effectively, the air filtration assembly requires original filtering cartridges specially shaped to operate with the box, thus also addressing the issue of non-original filtering cartridges.

Advantageously, the rigid connection obtained between the filtering cartridge and the box, in particular between the plate group and the housing region, allows a safe and solid engagement, as well as a safe and solid seal between the parts. Advantageously, the box inside the vehicle is positionable in any relative position without affecting the filtration methods.

Advantageously, the tubular filtering partitions are partially embedded in the plate body ensuring a mutual seal.

Advantageously, the plate body is a single component made of an elastically yielding material that comprises the sealing profiles and the abutment profiles, thus reducing the number of components and the costs associated with the production of the filtering cartridge.

Advantageously, the plate body is a single component made of an elastically yielding material that can be compressed volumetrically: this feature allows to achieve a stable positioning of the filtering cartridge inside the box over time and simultaneously to maintain the watertight coupling of the cartridge.

Advantageously, the plate body is a single component made of a closed-cells polyurethane foam obtained by means of a mixture of polyol and isocyanate in liquid form at room temperature, facilitating the hermetic incorporation of the end of the filtering material of the tubular partitions in the plate group during the production process.

Advantageously, the plate body is a single component made of a closed-cells polyurethane foam obtained by means of a mixture of polyol and isocyanate in liquid form at room temperature, facilitating the production of a plate group with the geometric shapes described in the present invention.

Advantageously, the plate body is a single component made of an elastically yielding material having suitable hardness properties to structurally support the tubular filtering partitions of the filtering cartridge.

Advantageously, the filtering cartridge is a single component.

It is apparent that, in order to meet contingent needs, those skilled in the art may make changes to the air filtration assembly described above, all contained within the scope of protection as defined by the following claims.

REFERENCE SYMBOL LIST

1 air filtration assembly
2 box
20 container
21 wall
210 sealing plane
22 abutment elements
22' abutment and thrust surface
25 housing region
28 inflow mouth
29 outflow mouth
200 cover
222 abutment projections
228 abutment fitting
3 filtering cartridge
4 tubular filtering partitions
40 internal cavities
45 ends
5 plate group
50 plate body
51 first face, sealing face
510 sealing profile
52 second face, abutment face
520 abutment profile
520', 222' abutment and thrust surface
520", 222" auxiliary abutment and thrust surface
58 internal reinforcing structure
59 outflow opening
6 auxiliary plate group
X-X longitudinal axis
V-V first axis, vertical axis
Y-Y second axis, transverse axis
Z insertion direction
S imaginary development plane
I1 first imaginary plane
I2 second imaginary plane
dx1, dx1', dx1", dx1'", dx2 longitudinal variable distance
dz1, dz1', dz2 vertical variable distance

The invention claimed is:

1. An air filtration assembly of a vehicle comprising:

a box comprising a wall extending along a first axis and a second axis and comprising at least one outflow mouth through which air flows, wherein the box further comprises a longitudinal axis incident to the first axis and the second axis; and a filtering cartridge comprising:

at least two tubular filtering partitions radially crossable relative to a longitudinal axis of the filtering partition during filtration; and a plate group comprising a plate body to which the at least two tubular filtering partitions are operatively connected, wherein the plate body extends along to an imaginary development plane positioned at the center-line of the thickness of the plate group and, on opposite sides of said imaginary development plane, comprises a first face comprising at least one sealing profile and a second face comprising at least two abutment profiles, wherein the plate body comprises at least one outflow opening suitable for putting the at least two tubular filtering partitions in fluid communication with the at least one outflow mouth;

wherein the filtering cartridge is insertable into the box along an insertion direction substantially parallel to the first axis or the second axis;

wherein the box further comprises a housing region between the wall and at least two abutment elements spaced apart on the longitudinal axis from the wall and axially spaced apart along one of said first or second axis, wherein the plate group is accommodated in said housing region with the first face sealingly engaged with the wall and the second face engaged by the at least two abutment elements;

wherein the at least one sealing profile or the at least two abutment profiles are shaped relative to or are positioned along the imaginary development plane and having a plurality of vertical distances that each vary as measured in a direction orthogonal to the insertion direction, and along said insertion direction;

wherein the at least one sealing profile or the at least two abutment profiles are shaped relative to or are positioned along the imaginary development plane and having a plurality of longitudinal distances that each vary as measured in a direction parallel to the longitudinal axis and along the first axis or the second axis; and wherein the plate body is a single component made of an elastically yielding material, and, the plate body is configured to be subjected to a volume compression.

2. The air filtration assembly of claim 1, wherein the at least one sealing profile is made integrally with the plate body, and at least one sealing profile is configured to be subjected to a volume compression.

3. The air filtration assembly of claim 1, wherein the plate group further comprises an internal reinforcing structure, and wherein the plate body covers said internal reinforcing structure.

4. The air filtration assembly of claim 1, wherein the at least two abutment profiles extend substantially orthogonally to the longitudinal axis.

5. The air filtration assembly of claim 1, wherein the at least two tubular filtering partitions each comprise an end embedded in the plate body.

6. The air filtration assembly of claim 1, wherein the at least two tubular filtering partitions are positioned defining a main extension row along the first axis or along the second axis along an axis incident to the insertion direction-.

7. The air filtration assembly of claim 6, wherein two tubular filtering partitions both belonging to a row and proximal to each other have respective filter axes offset, along both the first axis and the second axis.

8. The air filtration assembly of claim 1, wherein the first face extends along a first imaginary plane, and wherein said first imaginary plane is a planar plane.

9. The air filtration assembly of claim 1, wherein the first face extends along a first imaginary plane, and wherein said first imaginary plane comprises a plurality of first imaginary half-planes.

10. The air filtration assembly of claim 1, wherein the second face extends along a second imaginary plane, and wherein said second imaginary plane is a planar plane containing all the points that are on a continuous plane.

11. The air filtration assembly of claim 1, wherein the second face extends along a second imaginary plane, and wherein said second imaginary plane is a broken or serrated plane identifying a plurality of second imaginary half-planes.

12. The air filtration assembly of claim 11, wherein the second face extends in a broken manner along the insertion direction comprising a lower half-face and an upper half-face, and wherein the second imaginary plane is a broken plane, comprising two incident imaginary half-planes.

13. The air filtration assembly of claim 1, wherein the box further comprises a container, in which the filtering cartridge is at least partially housable, and a cover suitable for engaging and closing the container, and wherein the second face is engaged with the container and/or by the cover.

14. The air filtration assembly of claim 12, wherein the box further comprises a container, in which the filtering cartridge is at least partially housable, and a cover suitable for engaging and closing the container, wherein the second face is engaged by a thrust action by the container and/or by the cover, and wherein the container engages the lower half-face and the cover engages the upper half-face.

15. The air filtration assembly of claim 1, wherein the box between the at least two abutment elements comprises abutment fittings suitable for engaging the second face in a region between the at least two abutment profiles.

16. The air filtration assembly of claim 1, wherein the filtering cartridge comprises at least two filtering partition rows, and wherein each filtering partition row comprises at least two tubular filtering partitions.

17. The air filtration assembly of claim 1, wherein the at least two abutment profiles and the at least two abutment elements define respective abutment and thrust surfaces slidingly engageable during insertion of the cartridge into the box-, and wherein the abutment and thrust surfaces are shaped so that the cartridge is pushed and held in position in a longitudinal direction towards the wall.

18. The air filtration assembly of claim 1, wherein the plate group comprises a single sealing profile extending around the at least one outflow opening, defining a single sealing region through engagement with the wall.

19. The air filtration assembly of claim 1, wherein the plate group comprises a plurality of outflow openings and respective sealing profiles, each sealing profile extending around the respective outflow opening, defining a respective sealing region through engagement with the wall.

20. An engine air supply system of a vehicle, comprising the air filtration assembly of claim 1, wherein the box is fluidly connected to an air intake manifold, and the air is drawn in from an external environment through the air filtration assembly.

21. The air filtration assembly of claim 1, wherein the elastically yielding material is a closed-cell polyurethane foam.

22. The air filtration assembly of claim 13, wherein the cover comprises abutment projections suitable for engaging the at least two abutment profiles of the second face.

23. The air filtration assembly of claim 17, wherein the abutment and thrust surfaces are inclined so that the cartridge is pushed and held in position in the longitudinal direction towards the wall.

* * * * *